US010582801B2

(12) United States Patent
Herbert et al.

(10) Patent No.: US 10,582,801 B2
(45) Date of Patent: Mar. 10, 2020

(54) BEVERAGE PREPARATION SYSTEM

(71) Applicant: Island Oasis Frozen Cocktail Company, Inc., Walpole, MA (US)

(72) Inventors: John Michael Herbert, Winchester, MA (US); Bryan Hotaling, Harvard, MA (US); John Macneill, Acton, MA (US); Scott Leclerc, Ashby, MA (US); Matthew Naples, Acton, MA (US); Patrick Devine, Townsend, MA (US)

(73) Assignee: Island Oasis Frozen Cocktail Company, Inc., Walpole, MA (US)

( * ) Notice: Subject to any disclaimer, the term of this patent is extended or adjusted under 35 U.S.C. 154(b) by 219 days.

(21) Appl. No.: 15/592,767

(22) Filed: May 11, 2017

(65) Prior Publication Data
US 2017/0325621 A1 Nov. 16, 2017

Related U.S. Application Data

(60) Provisional application No. 62/335,041, filed on May 11, 2016.

(51) Int. Cl.
*A47J 31/52* (2006.01)
*G01G 19/56* (2006.01)
*A47J 43/07* (2006.01)

(52) U.S. Cl.
CPC ........ *A47J 31/52* (2013.01); *A47J 2043/0733* (2013.01); *G01G 19/56* (2013.01)

(58) Field of Classification Search
CPC .... A47J 31/52; A47J 2043/0733; G01G 19/56
See application file for complete search history.

(56) References Cited

U.S. PATENT DOCUMENTS

| 4,840,239 | A | 6/1989 | Slagg | |
| 8,616,250 | B2* | 12/2013 | Herbert | A23G 9/045 141/103 |
| 8,829,365 | B1* | 9/2014 | Wallace | G06F 13/382 177/25.13 |
| 9,499,385 | B1* | 11/2016 | Studor | B67D 3/0003 |
| 2007/0038727 | A1 | 2/2007 | Bailey et al. | |
| 2010/0037786 | A1 | 2/2010 | Kounlavong et al. | |
| 2011/0189357 | A1 | 8/2011 | Herbert | |
| 2014/0212566 | A1* | 7/2014 | Herbert | A23G 9/045 426/590 |

(Continued)

FOREIGN PATENT DOCUMENTS

WO 2004/065916 A2 8/2004
WO 2015/148089 A1 10/2015

OTHER PUBLICATIONS

International Search Report with Written Opinion dated Aug. 11, 2017, issued by the International Searching Authority in application No. PCT/US17/32159.

*Primary Examiner* — Eric Keasel
(74) *Attorney, Agent, or Firm* — Sughrue Mion, PLLC

(57) ABSTRACT

A weigh scale unit may be used in conjunction with a beverage preparation machine to prepare beverages efficiently. The weigh scale unit may provide the status of ingredient addition to a beverage receptacle. The weigh scale unit may send instructions and/or data to the beverage preparation machine. In some embodiments, the beverage preparation machine sends instructions and/or data to the weigh scale unit.

20 Claims, 27 Drawing Sheets

(56) References Cited

U.S. PATENT DOCUMENTS

2014/0332289 A1 11/2014 Gallagher, Jr.
2015/0305564 A1* 10/2015 Jimenez ................ A47J 43/046
366/141

* cited by examiner

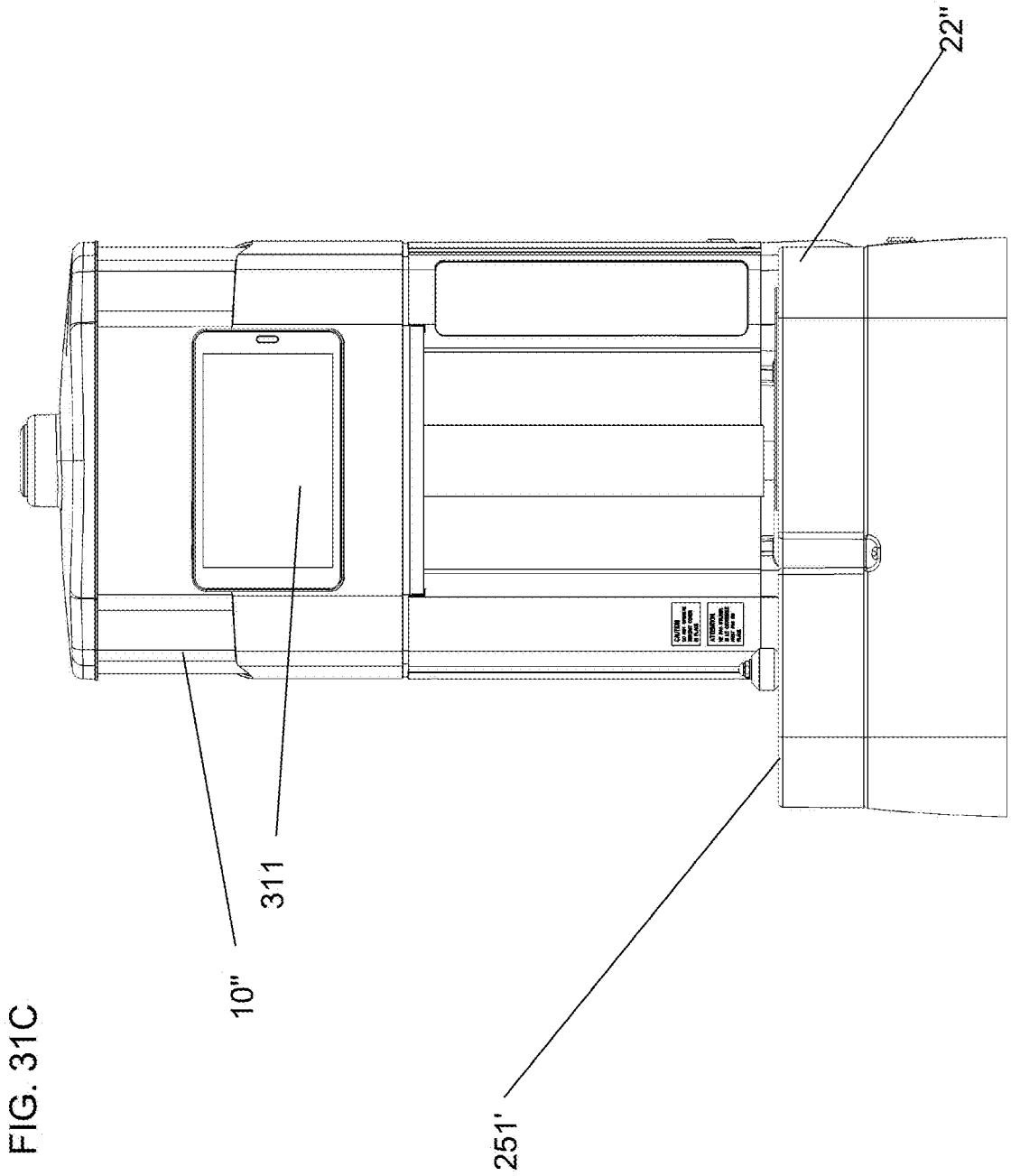

BEVERAGE PREPARATION SYSTEM

CROSS-REFERENCE TO RELATED APPLICATION

This application claims priority to provisional U.S. Application No. 62/335,041, filed May 11, 2016, which is hereby incorporated by reference in its entirety.

DISCUSSION OF RELATED ART

Various beverage preparation machines prepare different types of beverages. For example, combination blender and ice handling machines are often used to prepare "frozen" beverages. Coffee brewers pass hot water through coffee grounds. Other machines mix flavored syrups with water and other ingredients to create various beverages. Weigh scales are used in some instances to help a user with adding suitable amounts of ingredients in accordance with selected recipes.

SUMMARY OF EXAMPLES OF NON-LIMITING EMBODIMENTS

According to one embodiment, a beverage preparation system includes a weigh scale configured to weigh a beverage receptacle and ingredients within the beverage receptacle, a user input interface, a controller configured to receive weight data from the weigh scale, and a display. The system also includes a beverage preparation machine. The display is configured to display a status of ingredient additions to the beverage receptacle based on the weight data. The user input interface is configured to receive a selection of one or more beverage parameters from a user. The controller is configured to execute a first recipe display sequence on the display from among a plurality of recipe display sequences based on the selected beverage parameters. The controller is configured to communicate a first instruction for a first beverage preparation procedure to the beverage preparation machine from among a plurality of instructions for a plurality of possible beverage preparation procedures.

According to another embodiment, a method of preparing a beverage using a beverage receptacle, a weigh scale unit, and a beverage preparation machine is disclosed. The method includes placing the beverage receptacle on a weigh scale of the weigh scale unit, inputting one or more beverage parameters to a controller of the weigh scale unit, and adding a first ingredient to the beverage receptacle until a display of the weigh scale unit indicates that a sufficient amount of the first ingredient has been added. The method also includes adding a second ingredient to the beverage receptacle until the display of the weigh scale unit indicates that a sufficient amount of the second ingredient has been added. An act of removing the beverage receptacle from the weigh scale and placing the beverage preparation machine at a beverage receptacle-sensing position in the beverage preparation machine is included. No further input from the user is required to initiate a first beverage preparation procedure by the beverage preparation machine from among a plurality of beverage preparation procedures.

According to a further embodiment, a method of facilitating preparation of a beverage is disclosed. The method includes receiving a beverage receptacle on a weigh scale, receiving user input indicating a type of beverage to be prepared, indicating to a user a first ingredient type to be added to the beverage receptacle, and indicating to the user that a sufficient amount of the first ingredient has been added to the beverage receptacle. The method further includes indicating to a user a second ingredient type to be added to the beverage receptacle, indicating to the user that a sufficient amount of the second ingredient has been added to the beverage receptacle, and communicating which beverage preparation procedure to initiate from among a plurality of possible beverage preparation procedures.

According to yet another embodiment, a beverage preparation system includes a weigh scale unit and a beverage preparation machine. The weigh scale unit includes a weigh scale to weigh a beverage receptacle and ingredients within the beverage receptacle, a user input interface to receive a beverage parameter from a user, and a controller configured to receive weight data from the weigh scale. The weigh scale unit also includes a display configured to display a status of ingredient additions to the beverage receptacle based on the weight data, wherein the controller is configured to execute a first recipe display sequence on the display from among a plurality of recipe display sequences based on the selected beverage parameters. The beverage preparation machine is physically separate from the weigh scale unit, the beverage preparation machine being configured to receive the beverage receptacle. The weigh scale unit and the beverage preparation machine are in communication such that the weigh scale unit is able to send signals to the beverage preparation machine and/or the beverage preparation machine is able to send signals to the weigh scale unit.

According to a further embodiment, an apparatus for facilitating preparation of a beverage includes a weigh scale configured to weigh a beverage receptacle and ingredients within the beverage receptacle, a user input interface configured to receive a beverage parameter from a user, a controller configured to receive weight data from the weigh scale, and a display configured to display a status of ingredient additions to the beverage receptacle based on the weight data. The controller is configured to execute a first recipe display sequence on the display from among a plurality of recipe display sequences based on the selected beverage parameters. The controller is configured to send a first instruction for a first beverage preparation procedure to a beverage preparation machine from among a plurality of instructions for a plurality of possible beverage preparation procedures, the first instruction being based on the received beverage parameter.

According to yet another embodiment, a beverage preparation system includes a memory configured to store at least one recipe, wherein the recipe includes an ingredient addition step and a beverage preparation step. A weigh scale is provided that is configured to weigh a beverage receptacle and generate weight data, which is received by a controller. The system also includes a display, which can be a touch-screen display, that is configured to display the ingredient addition step and a real-time visual representation of an amount of ingredient that is added to the beverage receptacle. The system further includes a beverage preparation machine configured to perform the beverage preparation step, wherein the weigh scale and the beverage preparation machine are in communication such that the weigh scale is able to send signals to the beverage preparation machine and/or the beverage preparation machine is able to send signals to the weigh scale.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 31C shows a front view of the beverage preparation machine according to one embodiment.

DETAILED DESCRIPTION

Figure 1:
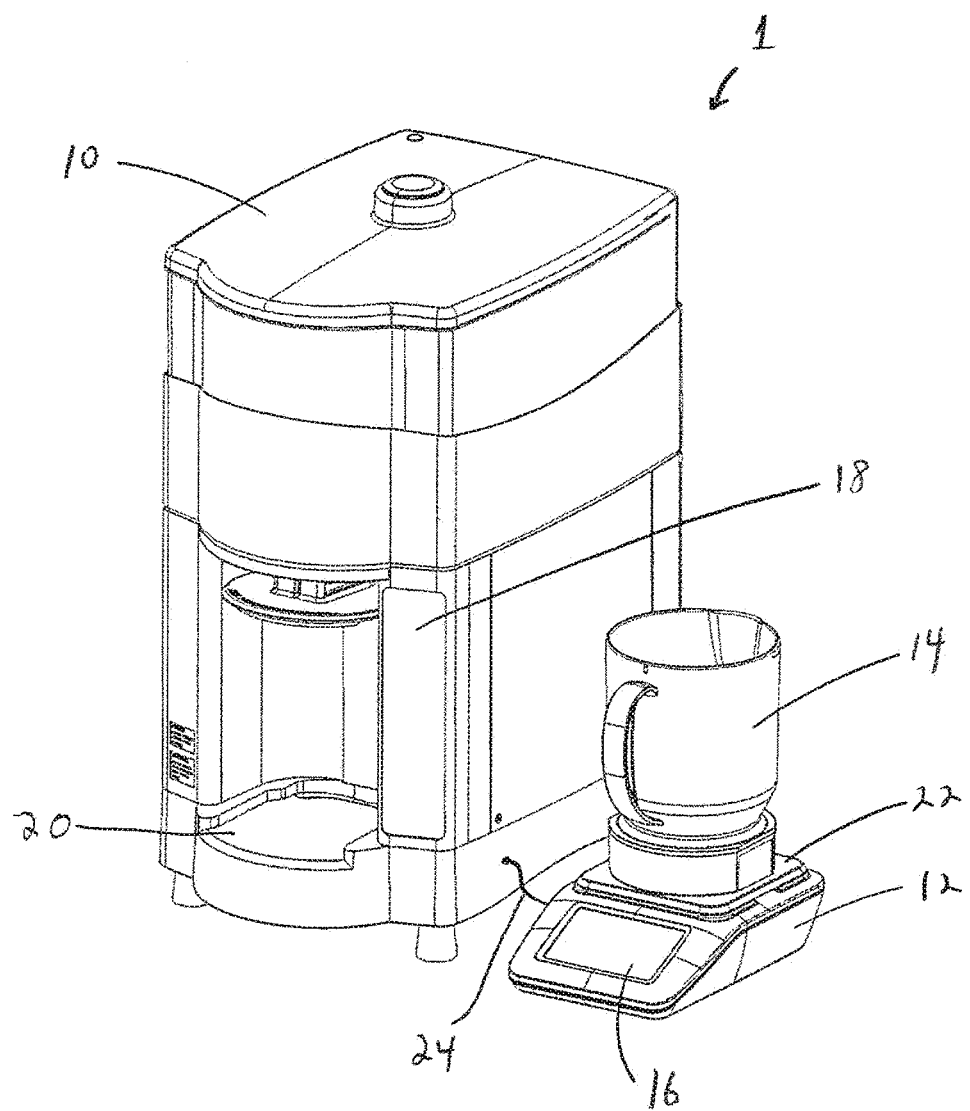
FIG. 1 shows a beverage preparation system including a beverage preparation machine and a weigh scale unit according to one embodiment.

While weigh scales and various recipe display techniques facilitate the addition of ingredients to a beverage, applicant has recognized that strategically providing instructions and/or information from the weigh scale unit to an associated beverage preparation machine and/or receiving information and/or instructions from the beverage preparation machine can improve the beverage preparation process in several ways.

According to some embodiments disclosed herein, a weigh scale is used to measure the amounts of one or more ingredients as they are added to a container. The presence, and in some cases, the amount of a certain ingredient, is communicated to the beverage preparation machine such that the machine can start certain processes prior to all of the ingredients being added to the container. For example, when an operator selects a frozen beverage recipe, and a threshold amount of an ingredient is added to the container, as measured by the weigh scale, the machine may be instructed to begin shaving ice. By doing so, the total time required to produce the beverage may be reduced. If an amount of ingredient is added which is more than called for by the recipe, the machine may shave additional ice when receiving a signal from the weigh scale unit or another controller associated with the weigh scale unit.

According to another embodiment, the beverage preparation machine may provide information to the weigh scale unit and/or a controller associated with the weigh scale unit. For example, a milkshake machine may include a blender, a flavoring-dispensing device, and a sweetener-dispensing device. If the supply of a certain flavoring is running low, the beverage machine may signal a weigh scale unit controller to display to the operator that only a limited size of milkshake can be prepared. The display may be adjusted by the controller to show scaled-down amounts of ingredients to add such that the proper ratios of ingredients are still possible with the limited amount of flavoring. Or, the display may signal to the operator that a certain beverage cannot be prepared until more supplies are added to the machine.

The weigh scale unit may instruct the beverage preparation machine to start a beverage preparation procedure once the presence of a beverage container is sensed in the beverage preparation machine. In some cases, the weigh scale unit may prescribe a certain procedure to the beverage preparation machine from among a number of available procedures based on beverage parameters input by the user.

In this manner, a user is not required to press any buttons or other control device on the beverage preparation machine. In some cases, the user does not have to select a beverage preparation procedure at all; selection of a beverage recipe and/or beverage parameters may result in the weigh scale unit sending an instruction to the beverage preparation machine as to which procedure to use. For example, after selecting a certain frozen beverage recipe on the weigh scale unit and adding the appropriate ingredients, a user may simply move the container from the weigh scale to the beverage preparation machine, and the beverage preparation machine may begin operations automatically. In other embodiments, a display on the weigh scale may instruct the user as to which button, or other control device, should be activated on the beverage forming machine.

For purposes herein, an instruction or signal that is at based at least in part on a beverage parameter is considered to be based on the beverage parameter.

In some embodiments, a display is provided on the same unit as the weigh scale, and, based on information provided by the beverage preparation machine regarding the machine's supply levels or operational capabilities, the display may show a subset of available recipes from which to choose.

The inventive concepts described herein can be implemented in any of numerous ways, and are not limited to any particular implementation techniques. Thus, while examples of specific implementation techniques are described below, it should be appreciated that the examples are provided merely for purposes of illustration, and that other implementations are possible.

Turning to the figures, FIG. 1 shows a beverage preparation system 1 according to one embodiment. The beverage preparation system 1 includes a beverage preparation machine 10 and a weigh scale unit 12. A beverage receptacle 14 is shown on weigh scale unit 12, and in the illustrated embodiment the receptacle is shown as a blender jar. Other suitable receptacles may be used, such as a cup, a single serve blender jar, or any other suitable beverage receptacle. The beverage receptacle may be configured such that someone can drink directly from the beverage receptacle, or the beverage receptacle may be a container which is designed to be used to pour beverages into separate serving containers.

Weigh scale unit 12 may include a display 16 to facilitate beverage preparation, as discussed herein. Alternatively, the display can be fixed to the beverage preparation machine or separate from both the weigh scale and the beverage preparation machine. The display may communicate with the weigh scale and the beverage preparation unit via wired or wireless connections. The display may be a touch-sensitive screen that can also be used as a user input interface. In some embodiments, a touch-sensitive screen which is separate from display 16 may be used, or some other suitable user input interface may be used, such as an arrangement of physical buttons and/or switches, or a keyboard, for example.

Beverage preparation machine 10 may include a display 18, which, like the display of weigh scale unit 12, also may function as an input device. In some embodiments, one or both of displays 16 and 18 may be LED lights associated with printed symbols or text on the respective units or an LCD, OLED, or other display type. In some embodiments one or both of the displays may be screens configured to show various graphics and text. The beverage preparation machine 10 or weigh scale 12 may also include or be connected to a speaker for communicating audible information to a user.

Figure 2:
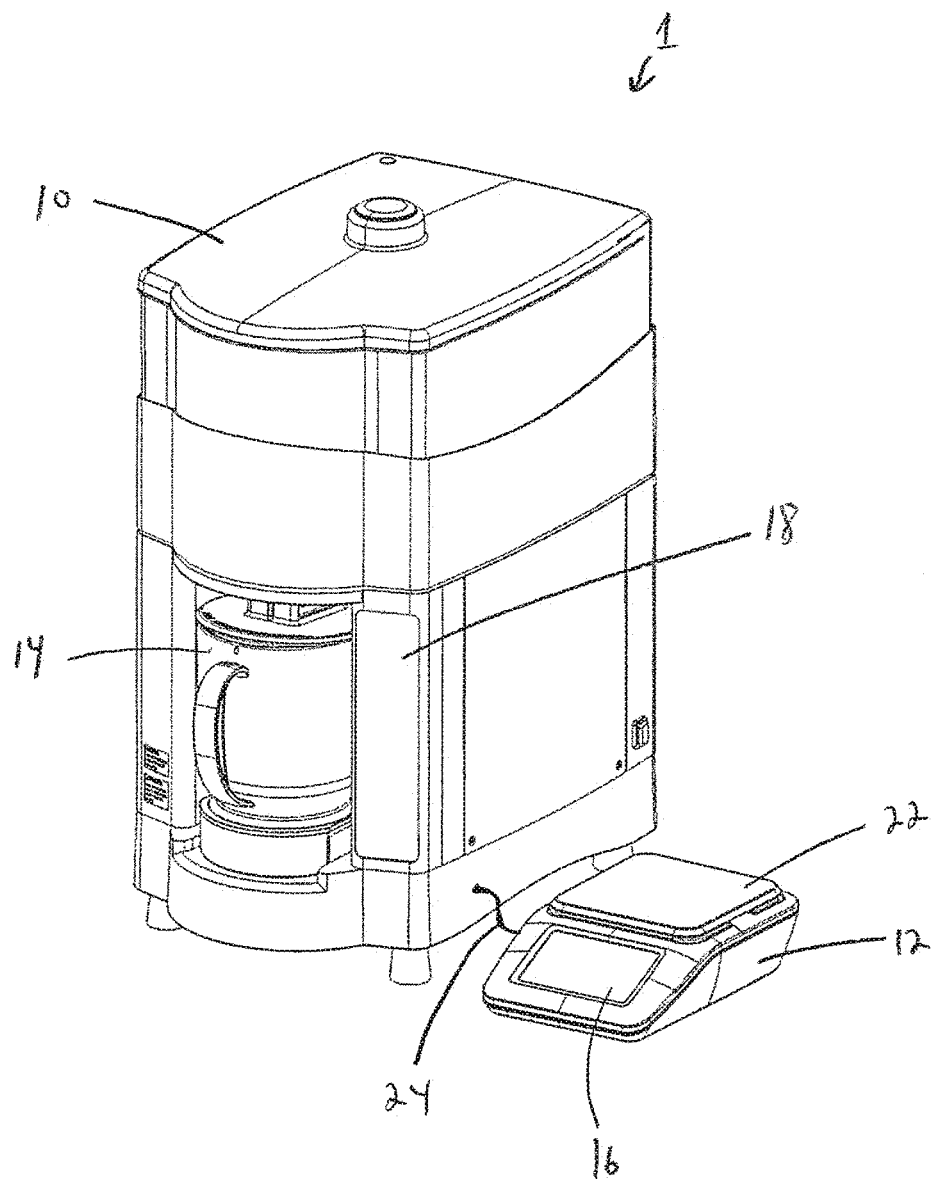
FIG. 2 shows the beverage preparation system of FIG. 1 with a beverage receptacle placed in the beverage preparation machine according to one embodiment.

Beverage preparation machine 10 includes a beverage receptacle support region 20, and may include a sensor to detect the presence or absence of a beverage receptacle in the machine. For example, a load cell may sense the weight of a beverage receptacle, an optical sensor may be used to sense the presence of a receptacle, a physical switch may be positioned to be triggered when a beverage receptacle is placed in the machine, or any other suitable sensor may be used. Beverage receptacle 14 is shown in beverage preparation machine 10 in FIG. 2. In some embodiments, by providing a sensor on the beverage preparation machine, the receptacle receiving area of the beverage preparation machine forms an area where the beverage receptacle can be placed in a beverage receptacle sensing position. The beverage preparation system may also include a controller and/or memory such as random access memory or storage such as a solid state drive for storing recipes and/or control software for executing various functions. Alternatively, the memory or storage for storing recipes can be located remotely, such as in a remote server, USB drive, smart phone or other device having a storage medium, and the weight scale or the beverage preparation device can download the recipes from the remote location. The beverage preparation system can have one or more communication ports or wireless communication capabilities, such as Wi-Fi, 3G, LTE, Bluetooth, millimeter waves, or NFC, in order to communicate with a remote storage, as well as with the weigh scale.

Beverage preparation machine 10 may include an ice hopper and storage for various ingredients such as flavorings, sweeteners, powder, water, and/or other ingredients or items to be added to a beverage. Alternatively, the ice hopper and/or storage can be located separately from the beverage preparation machine and weigh scale. Sensors, such as a weight sensor, can be included that measure an amount of flavoring, sweetener, powder, water, or other ingredients, so that this information can be communicated to the beverage preparation machine or weigh scale. A controller, for example, in the beverage preparation machine or weigh scale, may be provided to receive information from the internal sensor and communicating this information to the beverage preparation machine and/or the weigh scale. Beverage preparation machine 10 may include a blender, a water heater, an ice shaver, an ice cube dispenser, and ice cube chute, a powder dispenser, a shaker, and/or any other suitable mechanical systems for preparing a beverage. For example, the beverage preparation machine can include a TAYLOR MAGNABLEND OR ISLAND OASIS SB2100, SB2150, DD2100, DD2150 shaver blender unit. Alternatively, these components can be provided separately, in which case they are preferably controlled by a common controller in beverage preparation machine.

The beverage preparation system, preferably the beverage preparation machine 10, may include a refrigerated enclosure that stores chilled ingredients in order to facilitate preparation of chilled beverages. The system may also include a freezer enclosure to make or store ice or other frozen ingredients in order to facilitate preparation of chilled beverages. However, the system also can be implemented without a freezer enclosure or ice hopper, in which case a user would manually add ice to the prepared beverage. The ice can be an ingredient from the selected recipe and displayed on the weigh scale for the user to add to the receptacle placed on the weigh scale.

Figure 25:
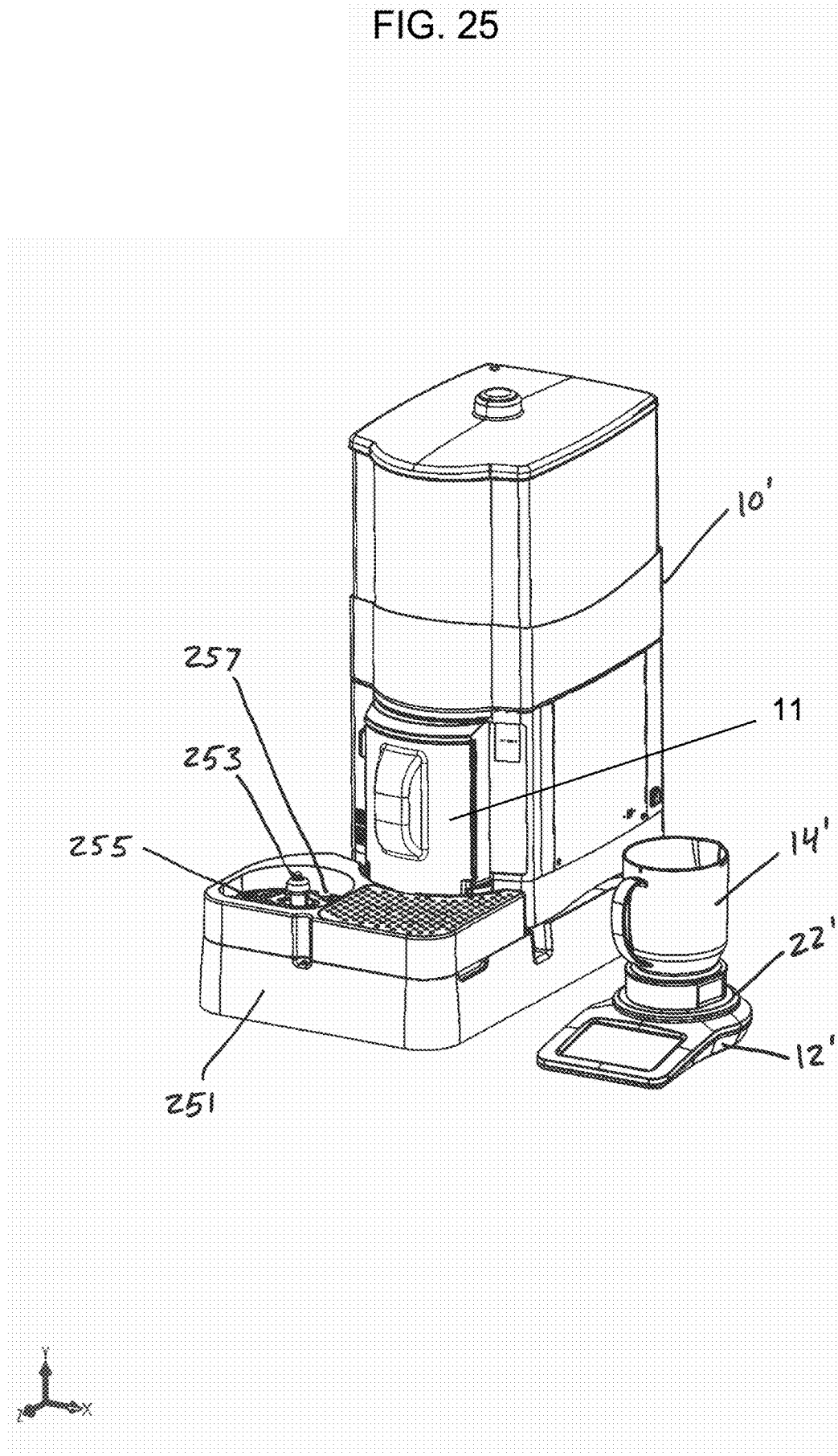
FIG. 25 illustrates an embodiment where the beverage preparation machine includes a rinse station.

The beverage preparation system may also include a door 11 as shown in FIG. 25, for example, that encloses the beverage receptacle support region 20 when the receptacle 14 is placed on the beverage support region. Additionally, the beverage preparation machine 10 may include sound insulation, such as insulating foam along at least a portion of its interior, or even on the inside surface of the door, in order to reduce an amount of noise generated by the beverage preparation machine 10.

Weigh scale unit 12 includes a weigh scale 22 to weigh the amounts of ingredients added to a beverage receptacle. As an ingredient is added to the receptacle, weigh scale 22 may provide weight data to a controller that controls display 16 to show the status of the amount of ingredient added. In some embodiments, the amount of ingredient added is shown relative to a desired amount of the ingredient. In this manner, a user can track the progress of how much of an ingredient has been added, and the process of adding the correct amounts of various ingredients can be simplified. The weigh scale unit 12 may also include or be associated with a speaker for communicating audible information to a user.

By weighing each ingredient as it is added directly to the beverage receptacle, the use of measuring cups or other specialty measuring equipment may be reduced or eliminated. Additionally, by providing interactive recipes on the display, a user does not necessarily need to refer to a manual, book, poster, or other printed materials. As such, the user does not have to search for recipes, and recipes can be updated more easily. For example, updated or additional recipes may be downloaded periodically via a computer network, or, in some embodiments, each time a recipe is selected, the recipe may be retrieved from a database via a computer network or the Internet.

According to some embodiments disclosed herein, weigh scale unit 12 sends one or more instructions to beverage preparation machine 10, which facilitates the preparation of beverages. Weigh scale unit 12 may be connected to beverage preparation machine 10 via a cable 24 which provides a data link, such as a USB connection, between the weigh scale unit 12 and the beverage preparation machine 10. Alternatively, the weigh scale unit 12 and beverage preparation machine 10 can be connected wirelessly via Wi-Fi, 3G, LTE, Bluetooth, millimeter waves, NFC, or another suitable wireless standard. The cable 24 can also provide a power link in addition to or in place of the data link.

The weigh scale unit 12 and/or the beverage preparation machine 10 may include wired or wireless communication circuitry for communicating via a wireless protocol such as Wi-Fi, 3G, LTE, Bluetooth, millimeter waves, NFC, or other wireless communication protocols for communicating outside the system. The weigh scale unit 12 may also include a memory such as random access memory or storage such as a solid state drive for storing recipes and/or control software for executing various functions.

The weigh scale may measure weight or mass and be considered a weigh scale.

Similarly, beverage preparation machine 10 may send data and/or instructions to weigh scale unit 12 in some embodiments. By having the beverage preparation machine 10 and weigh scale unit 12 communicate with each other, various efficiencies and other benefits can be achieved. In the embodiment illustrated in FIGS. 1 and 2, the beverage preparation machine is physically separate from the weigh scale unit, though in some embodiments, the beverage preparation machine and weigh scale unit may be part of the same physical device.

Figure 3:
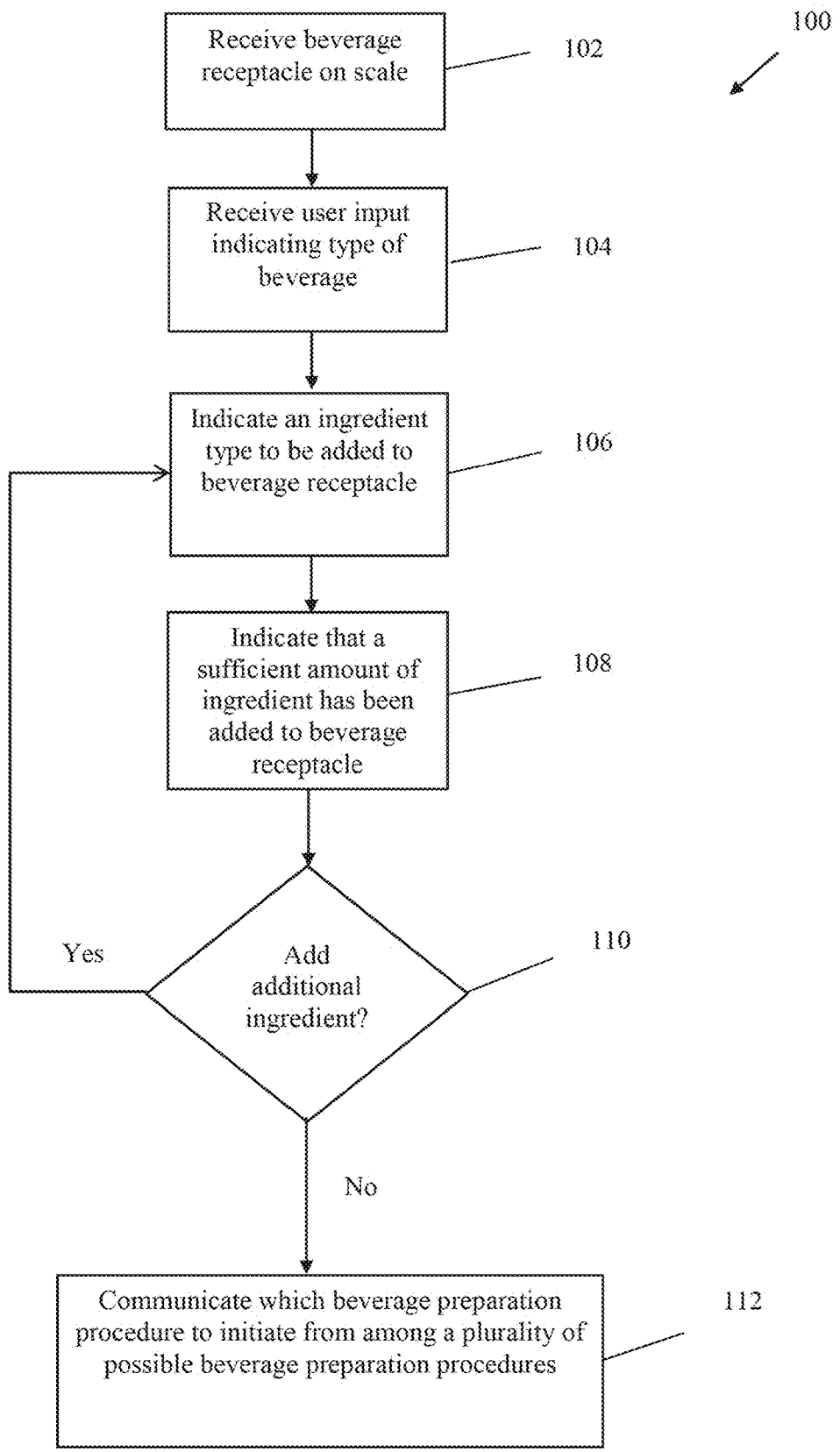
FIG. 3 is a flowchart of a method of preparing a beverage through use of a weigh scale unit and a beverage preparation machine.

FIG. 3 shows one method 100 of facilitating beverage production through use of a weigh scale unit and a beverage preparation machine. In an act 102, a beverage receptacle is received on the scale. The weigh scale unit receives a user input indicating a type of beverage in an act 104. The indication may indicate a specific type of beverage, and include both a general type of beverage (e.g., smoothie, milkshake, or coffee) and a specific flavor (e.g., strawberry). Or, in some embodiments, an initial input may be only a general type of beverage, and the selection may lead to a menu of different flavor options from which the user selects. These selections may be received by a weigh scale unit controller.

In an act 106, the weigh scale unit indicates an ingredient type to be added to the beverage receptacle. This indication may be in the form of a visual display. For example, a display screen may show the word "yogurt" and/or a graphical symbol representing yogurt. In some embodiments, the display may be an auditory display, such as spoken words.

Once a sufficient amount of ingredient has been added to the beverage receptacle based on the weigh scale's measurements of weight, the weigh scale unit indicates that a sufficient amount of the ingredient has been added in an act 108. The controller checks whether an additional ingredient is required by the recipe in a decision 110, and if so, repeats acts 106, 108.

After all of the ingredients have been added in sufficient amounts, in an act 112 the weigh scale unit communicates which beverage preparation procedure to initiate from among a plurality of possible beverage preparation procedures. For example, the weigh scale unit may send an instruction to the beverage preparation machine to use a specific blend cycle in conjunction with the addition of a certain amount of shaved ice. For a different recipe, the weigh scale unit may send an instruction to the beverage preparation machine to add cane sugar and water to the beverage, and to use a different blend cycle. In some embodiments, instead of sending an instruction to the beverage preparation machine, the weigh scale unit may display to the user that a certain button on the beverage preparation machine should be pressed after moving the beverage receptacle to the beverage preparation machine.

Figure 4:
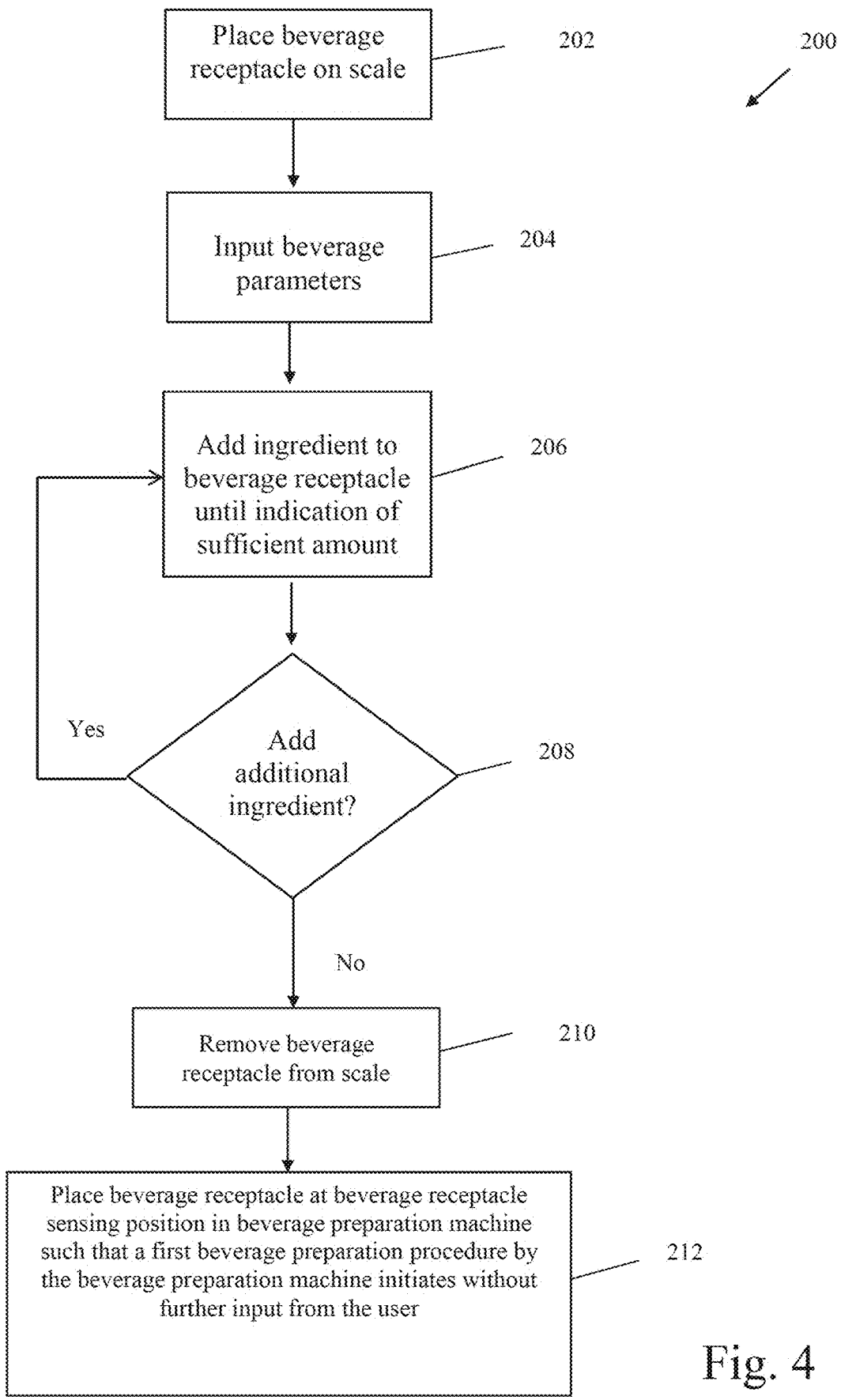
FIG. 4 is a flowchart of a method for a user to prepare a beverage using a weigh scale and a beverage preparation machine.

FIG. 4 shows a flowchart of a method 200 of preparing a beverage using a weigh scale unit and a beverage preparation machine. In an act 202, the user places a beverage receptacle on a weigh scale. The user inputs one or more beverage parameters in an act 204. While using a display associated with the weigh scale unit, the user adds an ingredient to the beverage receptacle until receiving an indication that a sufficient amount of the ingredient has been added. The user uses the display to understand whether an additional ingredient needs to be added in a decision 208. If yes, act 206 is repeated. If no, the user removes the beverage receptacle from the scale in an act 210 and places the beverage receptacle in the beverage preparation machine. The user places the beverage receptacle at a beverage receptacle sensing position in the beverage preparation machine in an act 212 such that a first beverage preparation procedure by the beverage preparation machine initiates without further input from the user. In this manner, the user does not have to know or decide which button or other input control to activate on the beverage preparation machine.

Additionally, in some embodiments, the weigh scale unit and the beverage preparation machine are in communication to carry out pre-processing by the beverage preparation machine. For example, the weigh scale unit may send instructions to the beverage preparation machine prior to completion of ingredient addition so that the beverage preparation machine can start one or more pre-processing steps. Such pre-processing steps can be based on stored recipes that instruct the shaver/blender to adjust the following: shave time (shave time produces more or less shaved ice based on ingredient ratios, drink size, number of drinks being produced, etc.); blend time (blend times allow the user to determine the consistency of the drink, longer blend times provides smoother drinks); addition of water (some recipes may call for additional water to be added, in which the recipe in the scale instructs the shaver/blender how much water should be added based on time—the longer the valve is open, the more water is added); addition of other liquid ingredients (some recipes may call for the addition of liquid sweeteners or flavors, in which the recipe in the scale instructs the shaver/blender to turn on a pump to dispense these liquid ingredients—the longer the pump stays on, the more product is dispensed); and the heating of liquid to be added to the beverage. The recipes can be programmed into the weigh scale/touch screen to prompt the shaver/blender to carry out the foregoing functions.

In some embodiments, a user may select a particular amount of time or an amount for the beverage preparation machine 10 to shave ice that is dispensed into the receptacle 14. For example, a user may select a low amount of ice, a medium amount of ice, or a high amount of ice. The beverage preparation machine 10 may then operate an ice shaver for a correspondingly low amount of time, a medium amount of time, or a high amount of time in order to produce one of three different amounts of shaved ice into the receptacle. The user may select the particular amount of time for shaving ice by selecting a virtual button on the display 16, or a virtual button on the display 18. The shaver blender of the beverage preparation machine 10 can be calibrated to ensure that the amounts of shaved ice dispensed is in accordance with the recipe. Instructions for calibrating the shaver blender can be run through the scale/display system. Items that can be calibrated are not limited to shaved ice, but also can include water amounts and liquid ingredient amounts (e.g., sweetener/flavorings), as some examples.

A shaved ice calibration routine can include the following steps involving communication between the weigh scale and the beverage preparation machine: (1) the blender cup is placed on the scale (tare scale); (2) the display instructs the user to place the blender cup in the shaver/blender; (3) the scale/display unit instructs the shaver/blender to run a calibration cycle and dispense "X" amount of ice; (4) the display instructs the user to place the blender cup (filled with shaved ice) back on the scale; (5) the scale determines if the weight of the shaved ice is correct; (6) if the weight is correct, calibration is complete; (7) if the weight is incorrect, the scale/display unit determines how much the shave time needs to be adjusted to achieve the proper amount of shaved ice and updates the shaver/blender accordingly. Once the adjustments are saved, the system prompts the user to run another calibration cycle to verify that the changes have obtained the desired result.

Figure 5:
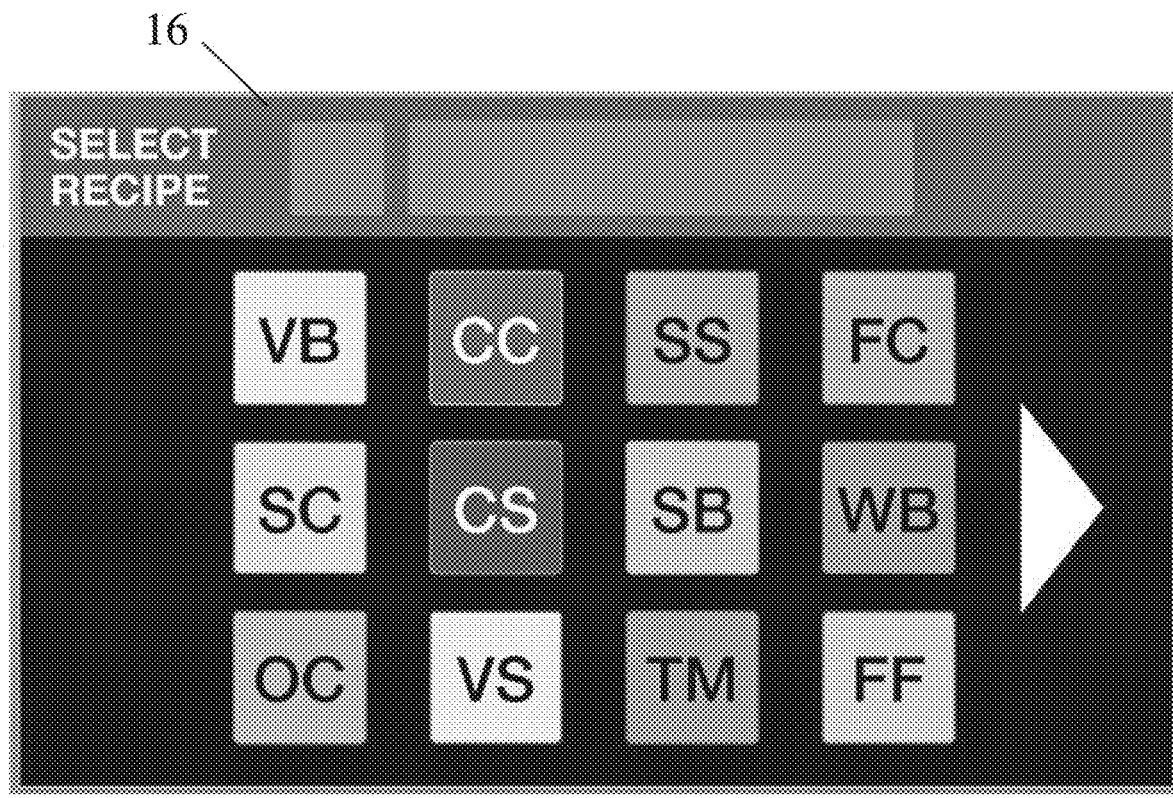
FIG. 5 shows a display on a weigh scale unit according to one embodiment.
Figure 6:
FIG. 6 shows a display on a weigh scale unit according to one embodiment.
Figure 7:
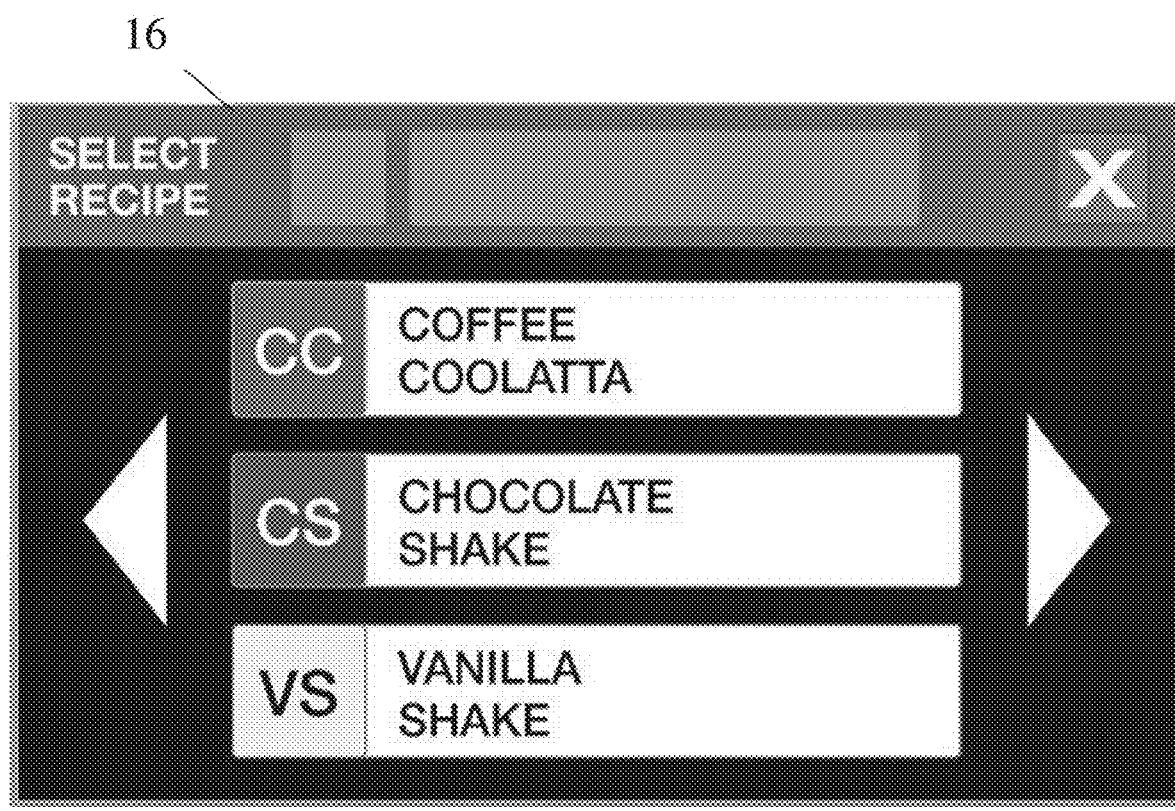
FIG. 7 shows a display on a weigh scale unit according to one embodiment.
Figure 8:
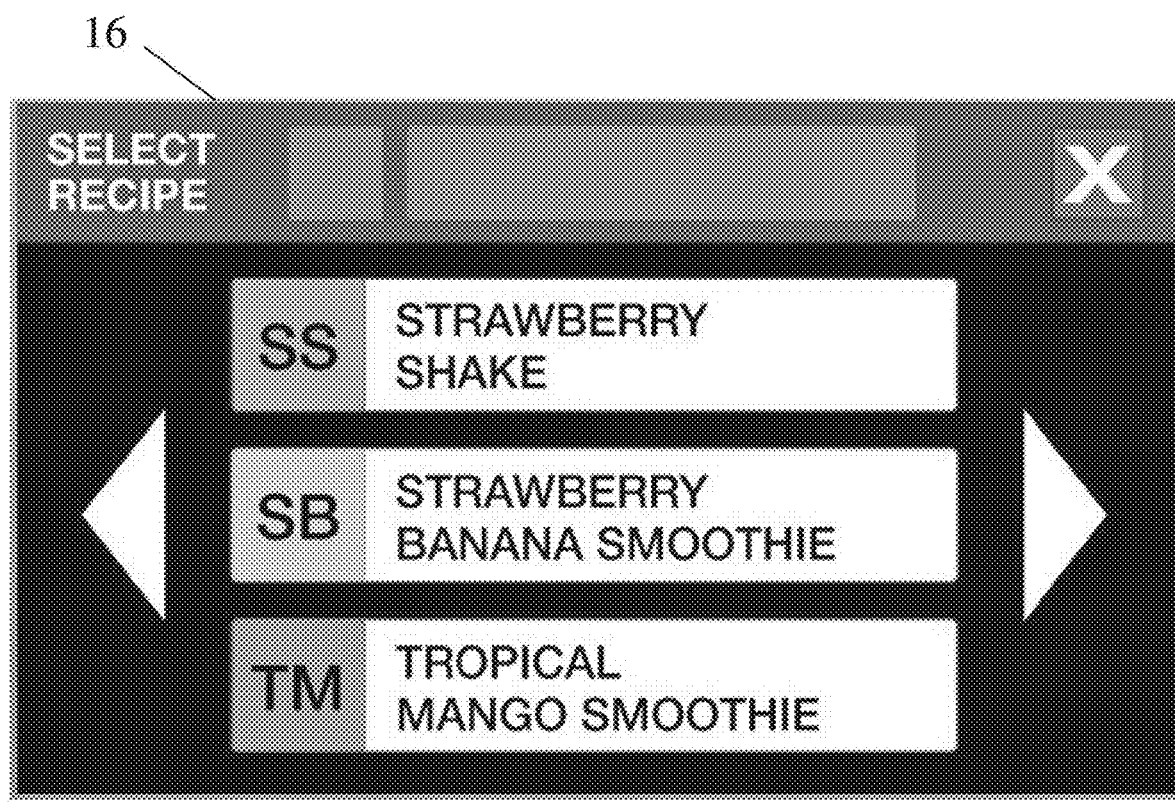
FIG. 8 shows a display on a weigh scale unit according to one embodiment.
Figure 9:
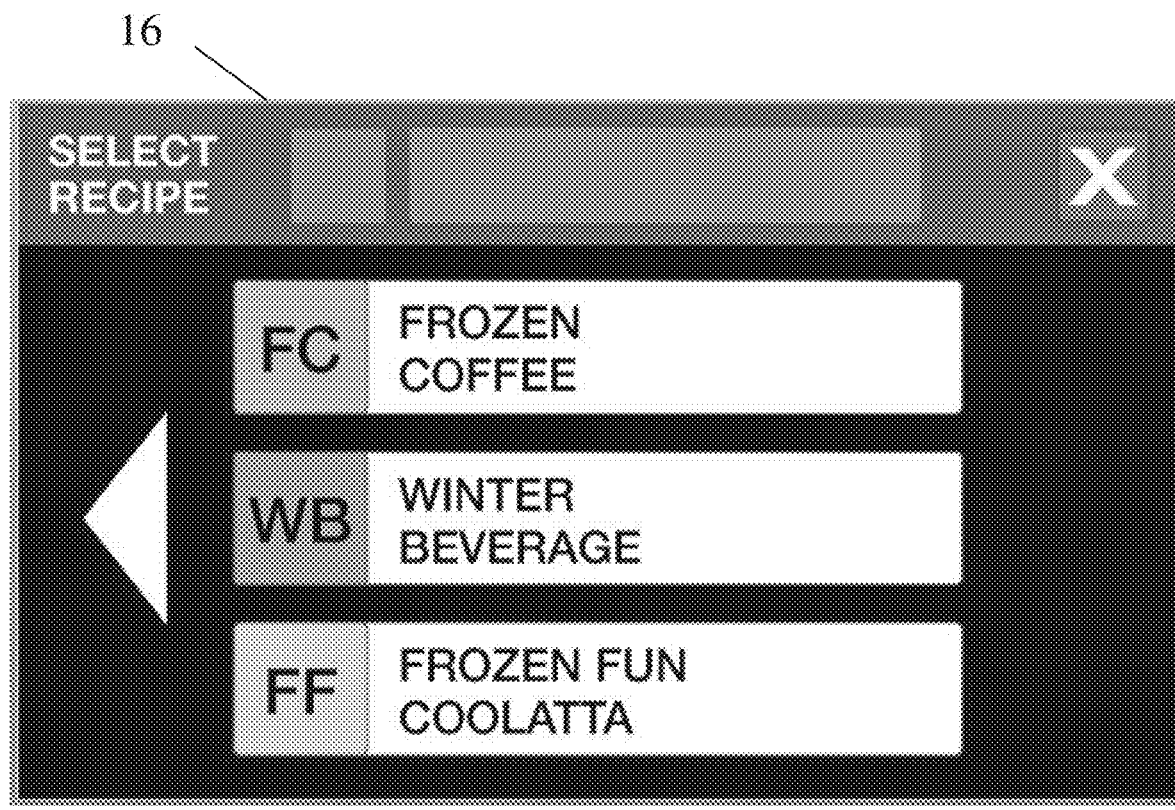
FIG. 9 shows a display on a weigh scale unit according to one embodiment.

Referring to FIG. 5, the display 16 of the weigh scale unit 12 may present a menu of recipes from which an operator may select a desired beverage recipe. Once a recipe is selected, the display 16 provides sequential instructions to the operator as to which ingredients to add to the beverage receptacle 14. As an ingredient is added, the display 16 indicates a level of the product in the beverage receptacle 14, and informs the operator when a sufficient amount of the ingredient has been added. The display 16 then informs the operator whether an additional ingredient should be added to the beverage receptacle. If one or more additional ingredients are required, the display 16 informs the operator as to which ingredient to add, and again informs the operator when a sufficient amount of the ingredient has been added. After all of the ingredients have been added, the display 16 indicates to the operator that the recipe is complete.

As shown in FIG. 5, in some embodiments, the display 16 of the weigh scale unit 12 may be configured to display several beverage recipes, each represented by an abbreviation of the specific recipe. With reference to FIGS. 6-9, the user can select "VB" for a vanilla bean slush-type beverage, "SC" for a strawberry slush-type beverage, "OC" for an orange slush-type beverage, "CC" for a coffee slush-type beverage, "CS" for a chocolate shake, "VS" for a vanilla shake, "SS" for a strawberry shake, "SB" for a strawberry banana smoothie, "TM" for a tropical mango smoothie, "FC" for a frozen coffee, "WB" for a winter beverage, and "FF" for a frozen fun slush-type beverage, to name only a few options. It should be understood that the display 16 may be configured to include any number of recipes, and further may be configured to be manipulated by the operator to add additional recipes to the group of recipes.

Figure 10:
FIG. 10 shows a display on a weigh scale unit according to one embodiment.

One or more beverage parameters may be selected by the user. For example, the operator may select the type of beverage as one parameter, e.g., "SB" for a strawberry banana smoothie, and may additionally select the size of the beverage as a second parameter. For example, with reference to FIG. 10, the user may select "S" for a small beverage, "M" for a medium beverage, and "L" for a large beverage. Different or additional size options may be provided. For example an extra-large beverage option may be provided, or "double small" or "double medium" options may be provided for preparing sufficient quantities of ingredients for two small beverages or two medium beverages, respectively. In some embodiments, a customized size option may be provided wherein the user can define a certain volume or weight of a beverage. Other parameters may be selected in some embodiments, such as beverage temperature, or whether crushed or cubed ice should be used.

Figure 11:
FIG. 11 shows a display on a weigh scale unit according to one embodiment.

With reference to FIG. 11, after selecting the beverage size, display 16 shows the ingredients associated with the selected beverage to the user. In the illustrated embodiment, the selected beverage—a strawberry banana smoothie—includes strawberry banana smoothie base, yogurt, and individually quick frozen ("IQF") strawberries. If the ingredients are acceptable, the operator touches the "OK" button to continue the process.

Figure 12:
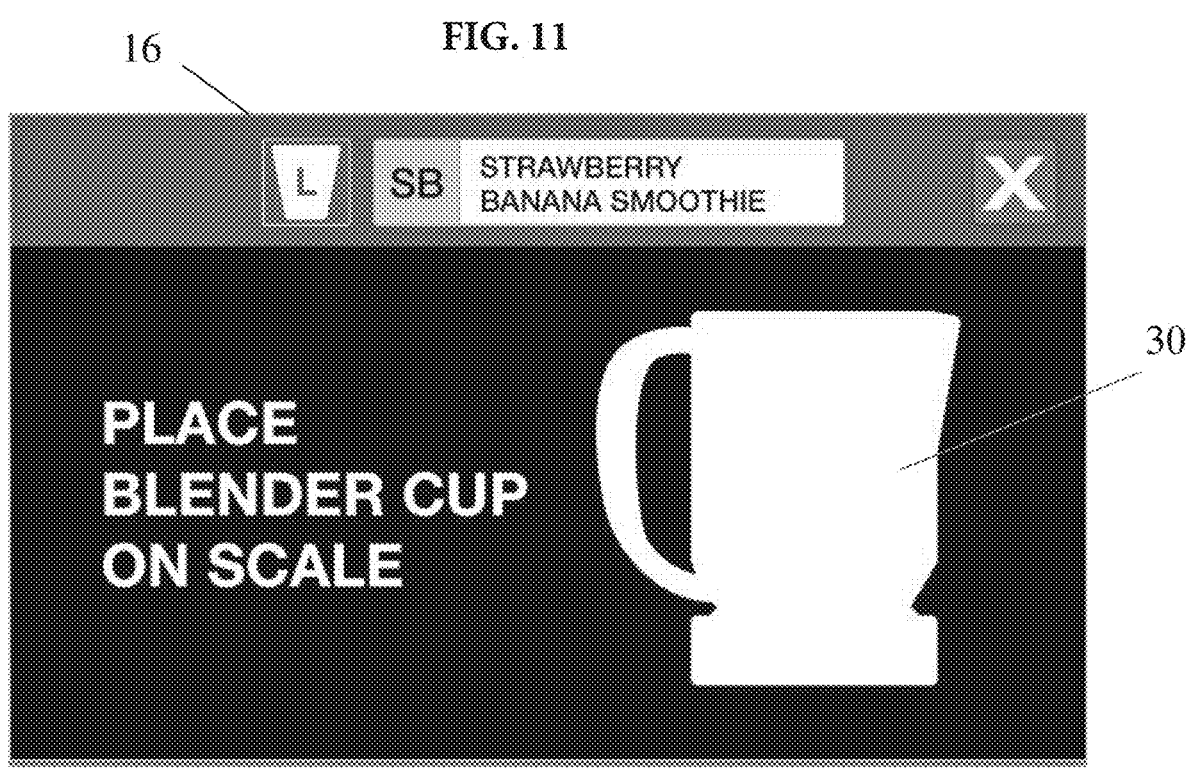
FIG. 12 shows a display on a weigh scale unit according to one embodiment.
Figure 13:
FIG. 13 shows a display on a weigh scale unit according to one embodiment.

Referring to FIG. 12, display 16 instructs the operator to place beverage receptacle 14 on a support 22 of the weigh scale. Representations of different beverage receptacle types may be used to help the user understand which beverage receptacle to use. For example, in FIG. 12, a blender jar 30 is shown, while in FIG. 13, display 16 shows a cup 32.

Figure 14:
FIG. 14 shows a display on a weigh scale unit according to one embodiment.
Figure 15:
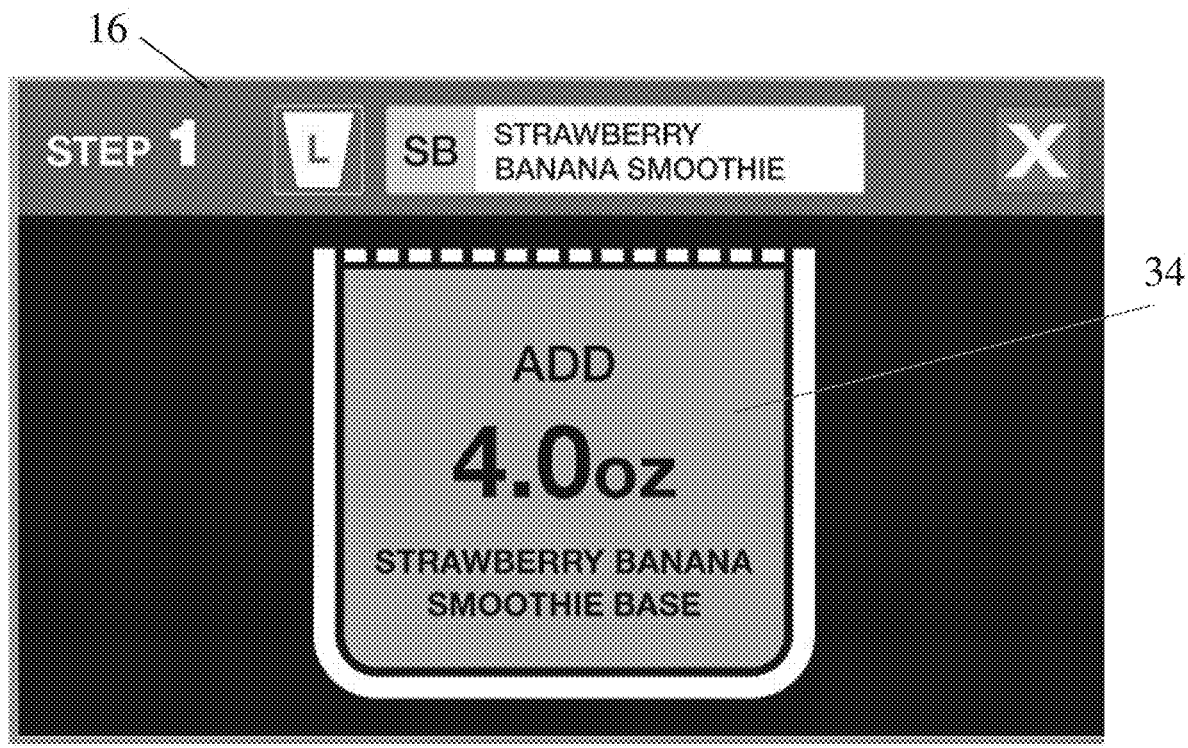
FIG. 15 shows a display on a weigh scale unit according to one embodiment.

Once the beverage receptacle 14 is suitably positioned on support 22 of weigh scale 12, display 16 of the weigh scale instructs or otherwise indicates to the user to add a certain amount of a first ingredient. For example, in the illustrated embodiment in FIG. 14, the user is instructed to add four ounces of smoothie base. Because the weigh scale 12 is configured to weigh the beverage receptacle and its contents, display 16 of the weigh scale may be configured to inform the user of the status of the first ingredient addition by schematically displaying a level of the first ingredient. For example, the color of the interior of the schematic blender receptacle may change in correlation with the amount of the first ingredient that has been added to the beverage receptacle. FIG. 15 shows schematic blender receptacle 34 nearly full, which represents the near completion of depositing the first ingredient into the beverage receptacle 14.

Other methods of displaying the progress of ingredient addition may be used. For example, a pie chart may fill in with a sweeping radius line in some embodiments. In other embodiments, a symbol may progress from a starting point toward a finish point based on the amount of first ingredient added. In still other embodiments, a display other than a schematic display may be used. For example, the percentage of the ingredient that has been added may be displayed simply as a number percentage. Or, the color of the overall screen may change from light to dark as an ingredient is added. A line graph may be used in some embodiments to show the level of ingredient increasing as time passes. With this arrangement, time may be shown on the x-axis with percentage of completion shown on the y-axis in some embodiments.

Figure 16:
FIG. 16 shows a display on a weigh scale unit according to one embodiment.

As shown in FIG. 16, once the desired amount of the first ingredient is added to the beverage receptacle, the display may instruct the user to stop adding the first ingredient by displaying the word "Stop", or otherwise indicating to stop adding the first ingredient.

Figure 17:
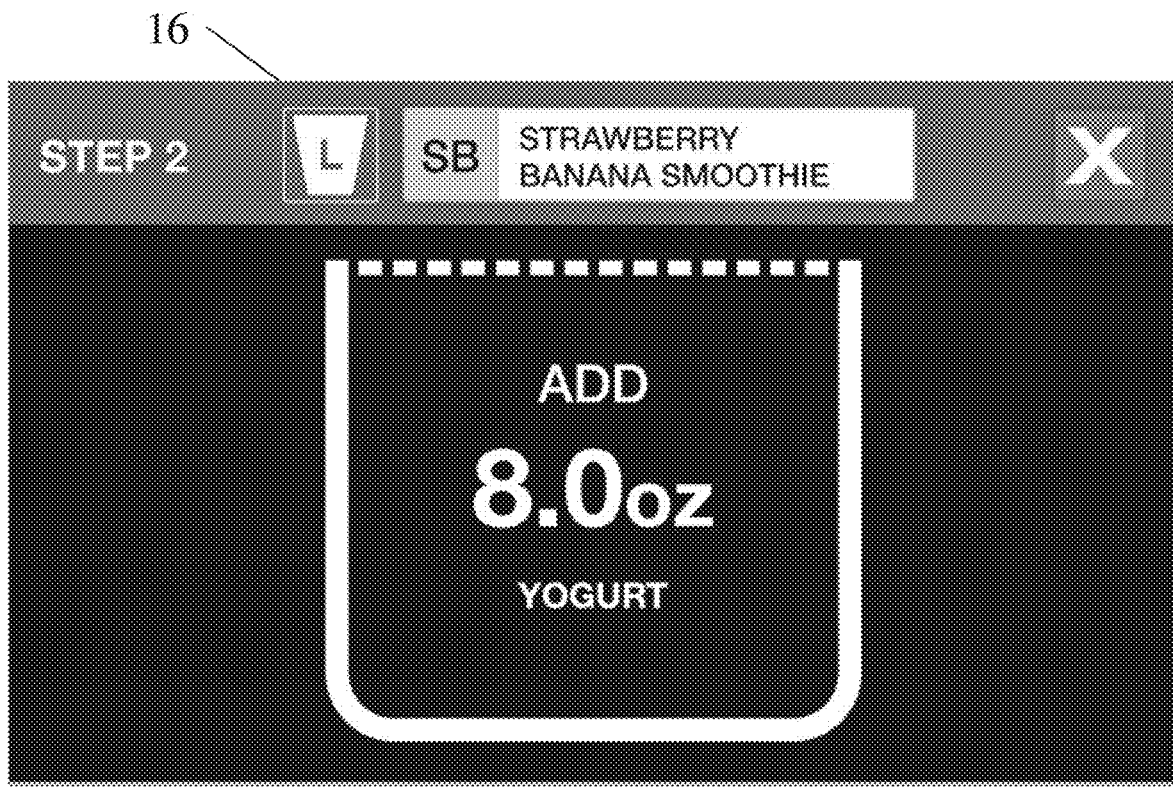
FIG. 17 shows a display on a weigh scale unit according to one embodiment.
Figure 18:
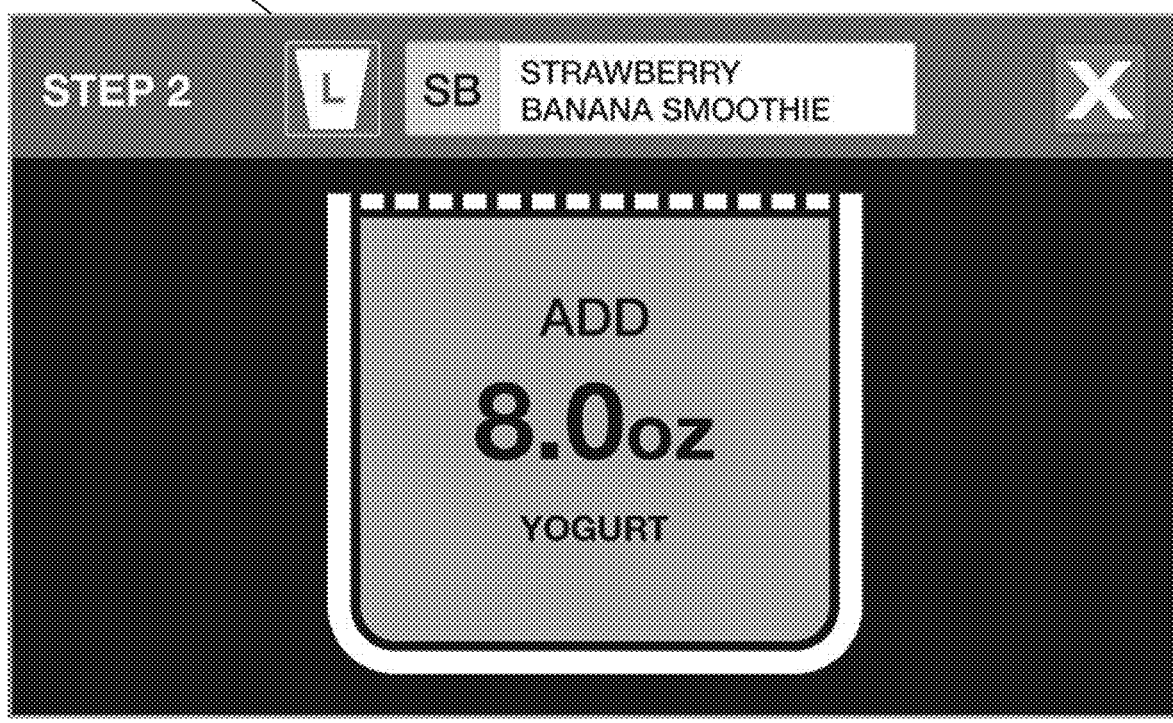
FIG. 18 shows a display on a weigh scale unit according to one embodiment.
Figure 19:
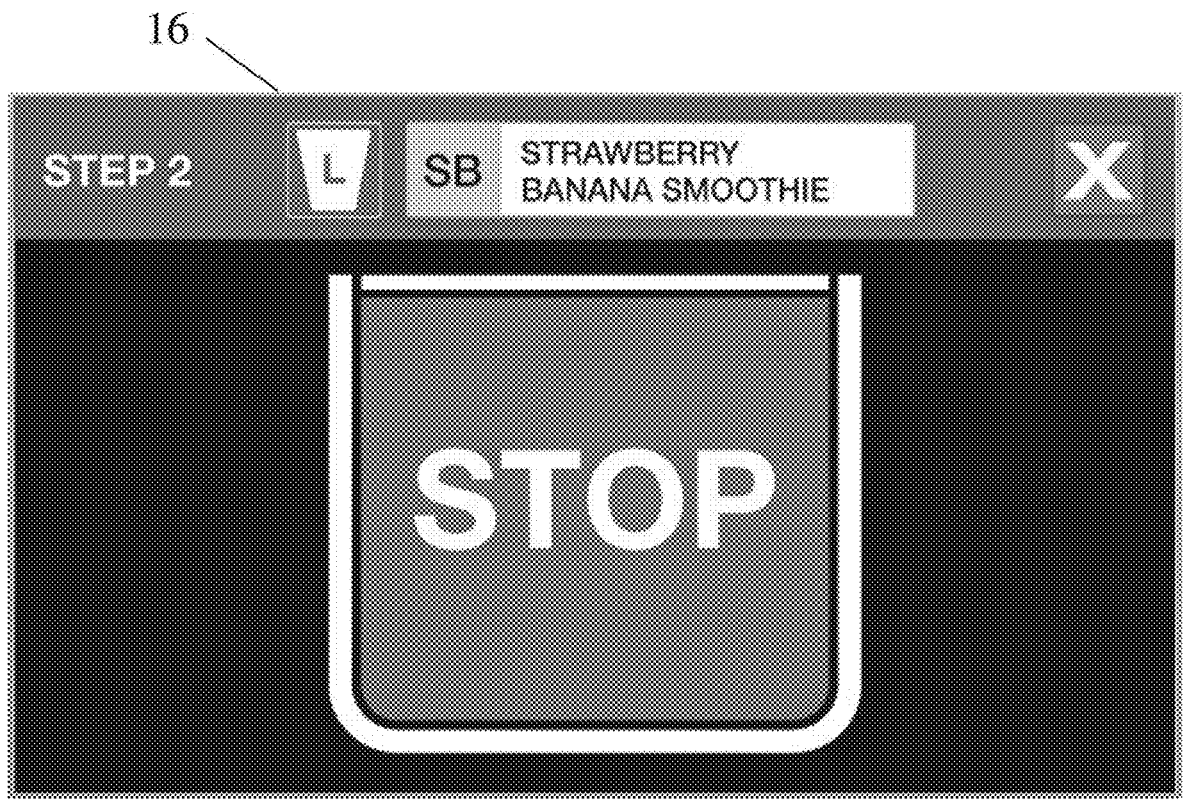
FIG. 19 shows a display on a weigh scale unit according to one embodiment.

Once the desired amount of the first ingredient has been deposited, if there is a second ingredient to be added, display 16 instructs the operator to add a desired amount of the second ingredient. In the illustrated embodiment, display 16 indicates that eight ounces of yogurt is required by the recipe. As with the first ingredient, display 16 is configured to display the status of the second ingredient addition through a schematic representation of the amount of the second ingredient that has been added. FIG. 17 shows that no yogurt has yet been added, while FIG. 18 shows that almost the complete amount of yogurt has been added. FIG. 19 includes a "Stop" instruction to indicate to the user that addition of the second ingredient should cease.

Figure 20:
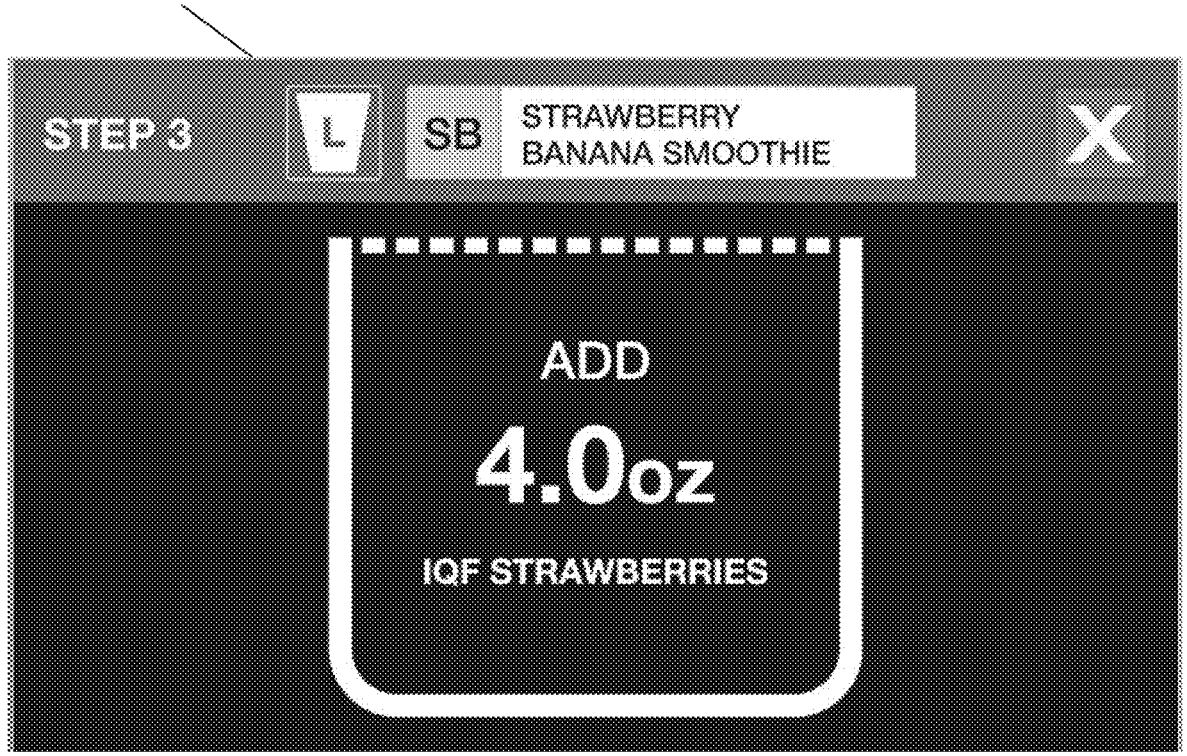
FIG. 20 shows a display on a weigh scale unit according to one embodiment.
Figure 21:
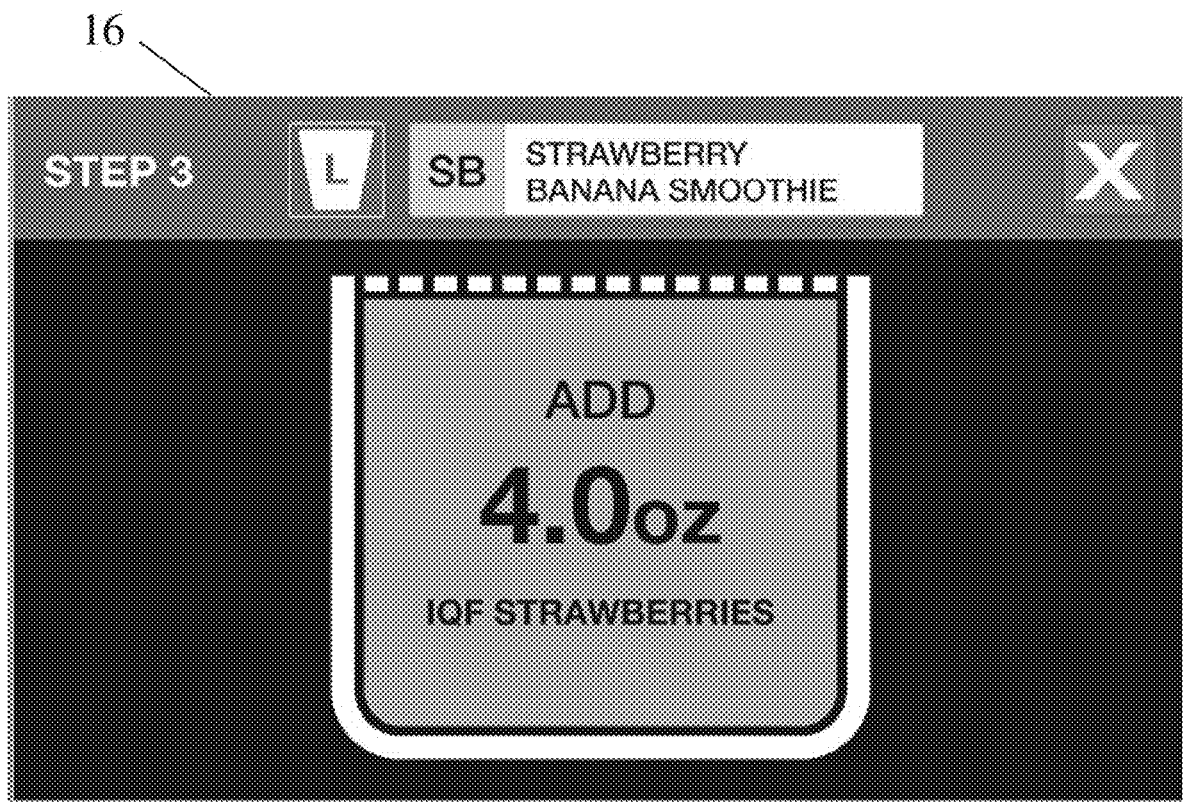
FIG. 21 shows a display on a weigh scale unit according to one embodiment.
Figure 22:
FIG. 22 shows a display on a weigh scale unit according to one embodiment.

A similar process may be used for further ingredients, such as IGF strawberries as shown in FIGS. 20 and 21. Referring to FIG. 22, display 16 can be configured to alert the operator that the desired amount of a certain ingredient of the recipe has been exceeded. In some embodiments, display 16 can be configured to provide the operator with the option of continuing with the preparation of the beverage with a "Continue" button or restarting the process with a "Restart" button as discuss further below.

Figure 23:
FIG. 23 shows a display on a weigh scale unit according to one embodiment.

Referring to FIG. 23, once all of the ingredients of a particular recipe have been added to the beverage receptacle, the display 16 may instruct the operator to place the beverage receptacle in the beverage preparation machine 10. Once the beverage receptacle 14 is moved to the beverage preparation machine, a sensor on the beverage preparation machine may sense the presence of the beverage receptacle and begin a beverage preparation procedure, such as one or more of: adding shaved ice; blending the ingredients; heating the ingredients; adding sweetener or flavorings; or any other suitable operations.

As described herein, in some embodiments, weigh scale unit 12 sends one or more instructions to the beverage preparation machine to indicate which beverage preparation procedure to initiate from among a plurality of beverage preparation procedures. In some embodiments the weigh scale unit sends a single instruction which indicates which procedure to initiate. In other embodiments, the weigh scale unit may send a number of specific instructions regarding each of several separate operations. For example, the weigh scale unit may instruct the beverage preparation machine by sending separate instructions to specifically instruct the beverage preparation machine to add one cup of shaved ice, blend for thirty seconds, and add four grams of sweetener. By sending one or more instructions to the beverage preparation machine, the weigh scale unit may allow the user to prepare a beverage with a limited number of input indications. For example, after selecting a recipe and/or other beverage parameters, the user may not need to press any buttons or otherwise provide input to the beverage preparation system. Such an arrangement may improve efficiency and limit the amount of cleaning required.

As shown in FIGS. 6-23, the display 16 of the weigh scale 12 may be configured with an "X" button, which instructs the operator to cancel out of a particular recipe. In some embodiments, the "X" button may be configured to move the operator to the last shown screenshot on the display 16. It should be understood that the preparation of the strawberry banana smoothie is for illustration purposes only, and that display 16 can be configured to facilitate preparation of any suitable recipe. The weigh scale unit may be configured to enable the operator to input new recipes into the weigh scale unit.

Figure 24:
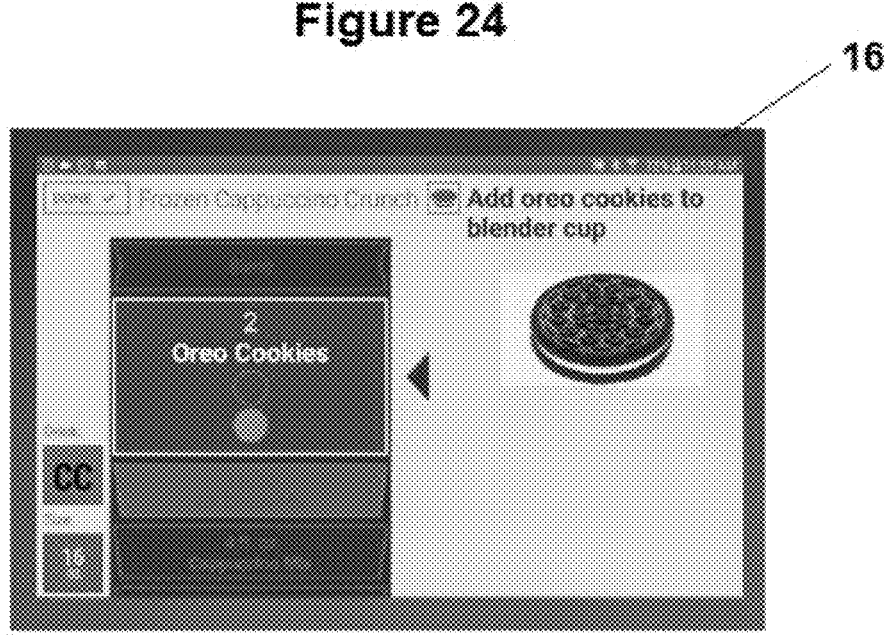
FIG. 24 shows a display on a weigh scale where the display guides an operator in adding a solid ingredient.

While the assessment of the proper amount of all ingredients can be determined by weight, the system can also indicate to the operator the proper amount for certain solid ingredients to be added by count when more convenient. In such embodiments, the system can covert weights to quantities or simply register a count in response to operator input. For example, as shown in FIG. 24, the display 16 may display a screen to guide the operator in adding a specific amount of certain solid ingredients, such as cookies, by count. In this embodiment, the display may display an image of two cookies. After the operator adds a first cookie, the display indicates the first cookie has been added. After the operator adds a second cookie, the display indicates that the second cookie has been added, and the display can subsequently display the next step of beverage preparation.

As shown in FIG. 25, the beverage preparation machine may include a rinse station 251. The rinse station includes a sprinkler 253 that disperses a cleaning fluid such as water or other cleaning solution in an upward direction. The rinse station may also include a recessed floor 255 that has one or more drainage holes 257. In practice, an operator places the beverage receptacle 14' upside down in the rinse station so that an upper portion of the beverage receptacle 14' contacts the recessed floor. The sprinkler then disperses the cleaning fluid, which washes away residue that is left behind on the interior of the beverage receptacle 14' after the beverage preparation machine 10' has produced a beverage and dispensed it into the beverage receptacle 14'. Both the cleaning fluid and the residue left behind on the beverage receptacle then flow through the one or more drainage holes. The system also includes a beverage preparation machine 10', a weigh scale unit 12' and a weigh scale 22'. The beverage preparation machine 10' may also include a door 11.

In certain embodiments, the beverage preparation machine may be configured such that it can perform multiple functions simultaneously. For example, the beverage preparation machine may include an ice shaver, a blending/mixing mechanism, and a rinse station. The beverage preparation machine may be configured to operate at least two of the ice shaver, the blending/mixing mechanism, and the rinse station simultaneously, in order to increase the system's beverage production capacity.

Figure 26:
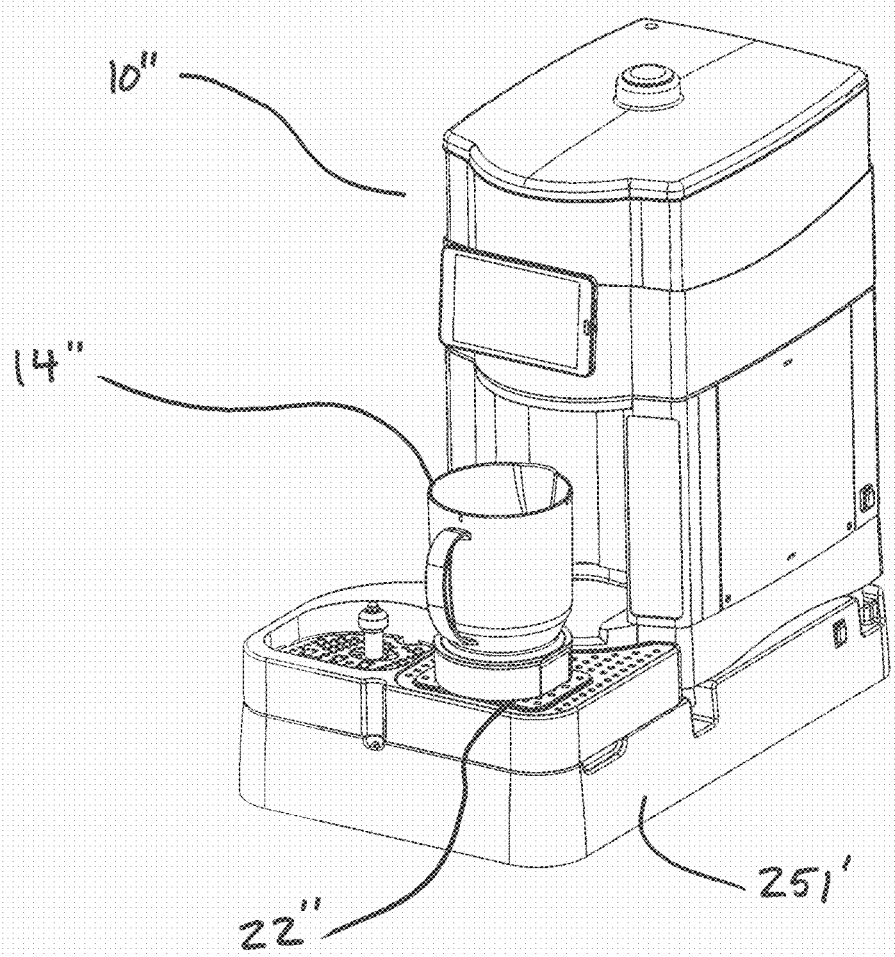
FIG. 26 illustrates an embodiment where the beverage preparation machine includes a rinse station, and the weigh scale unit is integrated with the beverage preparation machine.

The embodiment shown in FIG. 26 also includes a rinse station 251', which is already described above with reference to FIG. 25. The rinse station 251' may also include a sprinkler 253, floor 255, and drainage holes 257 as shown in FIG. 25. However, the embodiment shown in FIG. 26 is configured such that the weigh scale 22" is integrated with the beverage preparation machine 10". By contrast, in the embodiment shown in FIG. 1, the weigh scale unit and the beverage preparation machine are separate structures. Also shown is receptacle 14" and beverage preparation machine 10".

Figure 27:
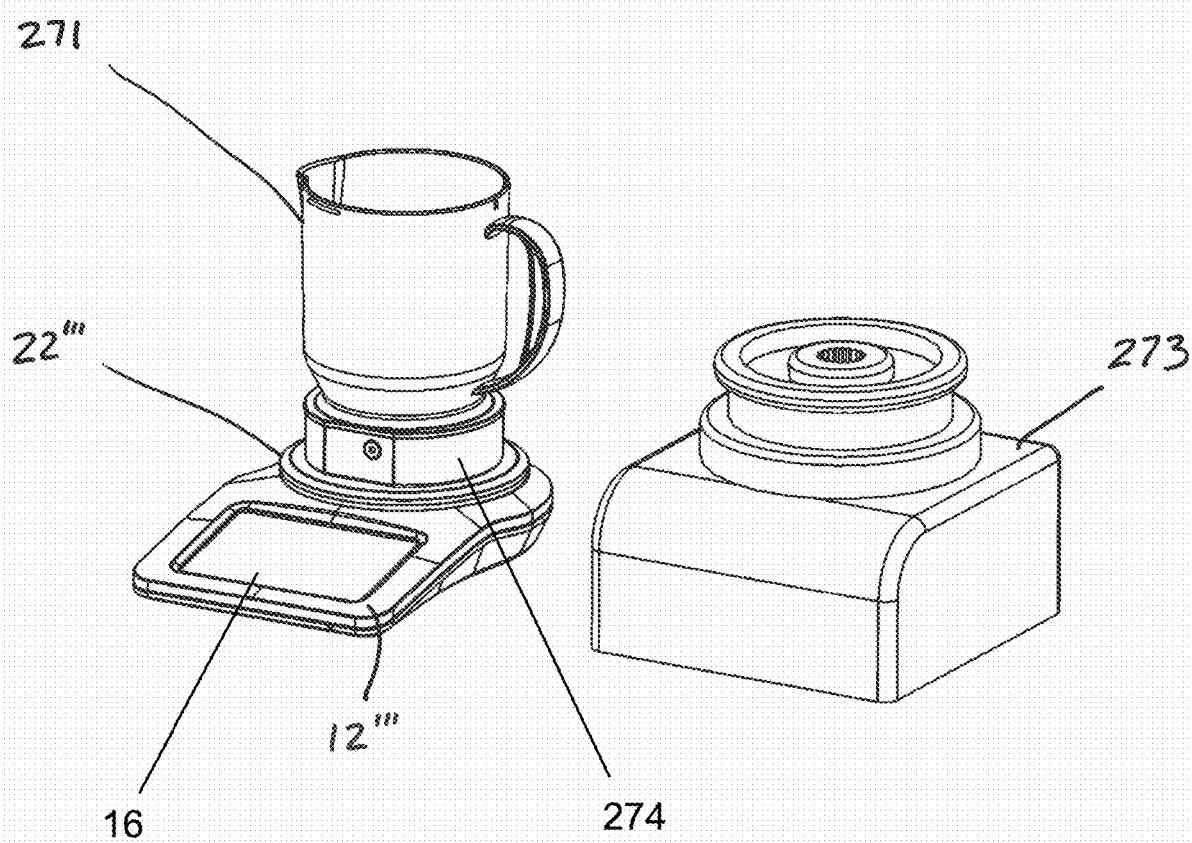
FIG. 27 illustrates an embodiment where the weigh scale unit holds a container for a conventional blender assembly.

FIG. 27 illustrates an embodiment where the weigh scale unit holds a container 271 for a conventional blender assembly 273. In this embodiment, the beverage preparation machine 10 illustrated in, for example, FIG. 1, is omitted. As a result, if an operator already owns a conventional blender assembly, the operator may place the container 271 on top of the weigh scale unit, follow the instructions on the display 16, transfer the container 271 and connect it to the conventional blender assembly 273, and blend the ingredients inside the container 271 to produce a beverage. Also shown is weigh scale unit 12''' and weigh scale 22'''. The weigh scale can include a support base 274 for supporting the blender container on the weigh scale.

Figure 28:
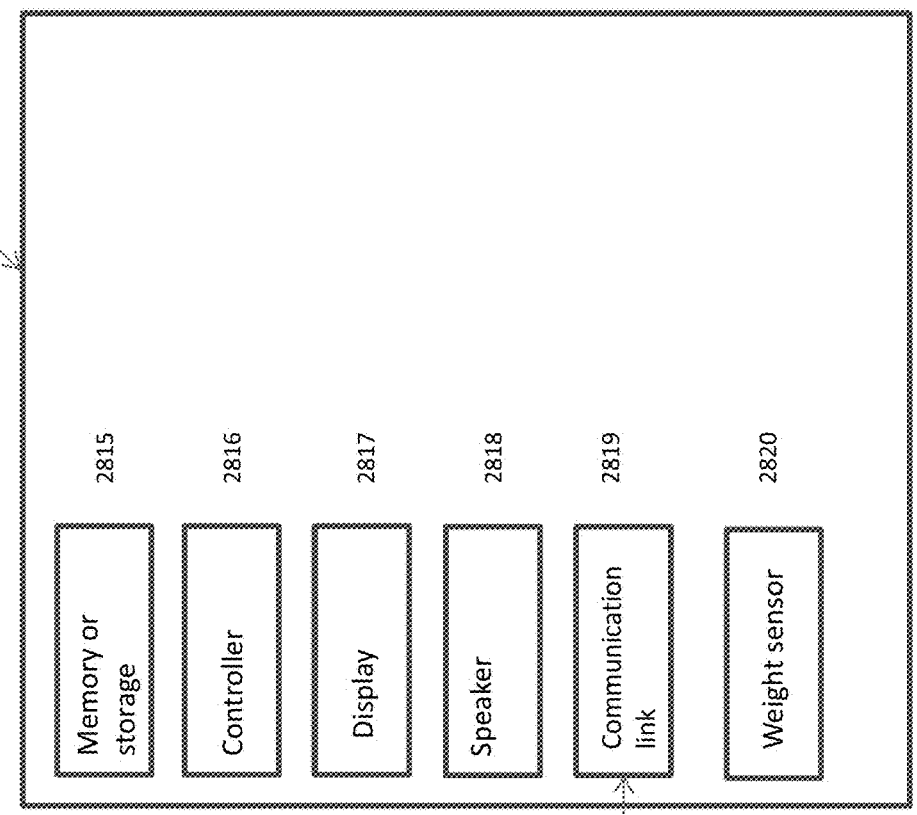
FIG. 28 illustrates a block diagram of the beverage preparation machine, the weigh scale, and certain components of the beverage preparation machine and the weigh scale.
Figure 28:
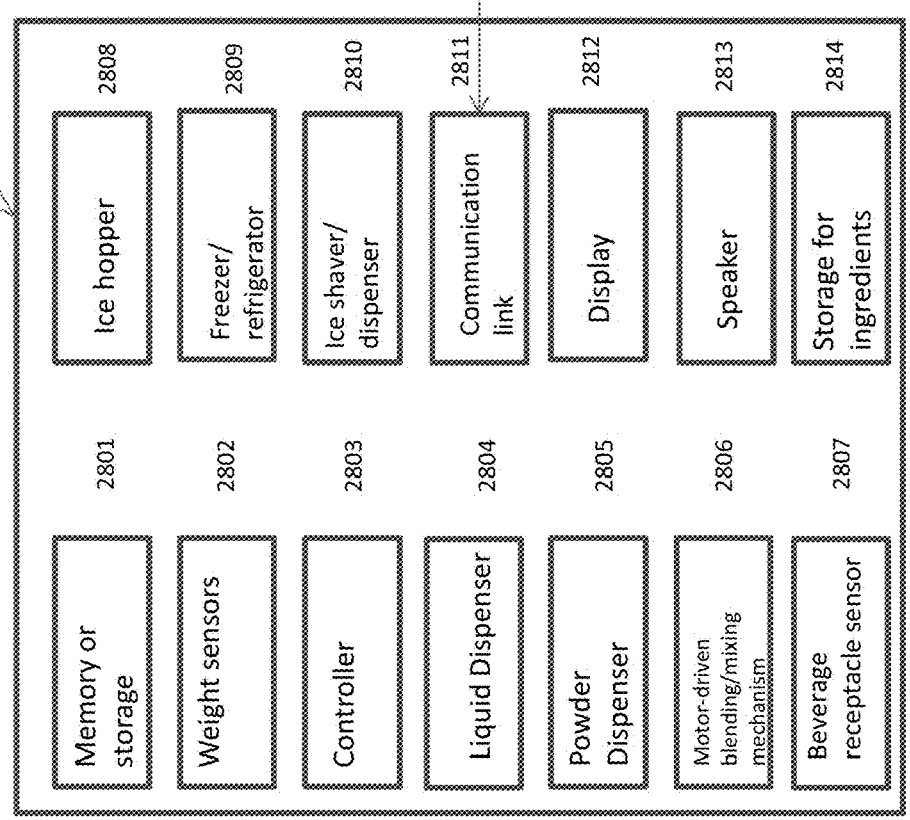

FIG. 28 illustrates a schematic block diagram 2821 of a beverage preparation machine and a schematic block diagram 2822 of a weigh scale. The beverage preparation machine includes a memory or storage 2801, weight sensors for measuring ingredient quantities 2802, and a controller 2803.

The beverage preparation machine also includes a liquid dispenser 2804 for dispensing liquid ingredients such as water, flavoring, or liquid mixtures. Also included is a powder dispenser 2805 for dispensing material such as protein powder, sugar, or powdered flavoring.

The beverage preparation machine also includes a blending/mixing mechanism 2806, which could be constituted by a blade or set of blades that is/are inserted into the receptacle and rotated, vibrated, or otherwise set into motion in order to blend or mix the beverage ingredients. Alternatively, the receptacle can include a blade or set of blades in order to blend or mix the beverage ingredients. A motor may drive the blending/mixing mechanism. Also included is a beverage receptacle sensor 2807 that can sense the presence of the receptacle when it is placed onto/into the beverage preparation machine. Also included is at least one storage compartment for ingredients 2814.

The beverage preparation machine may also include an ice hopper 2808, or a freezer or refrigerator 2809 and/or ice shaper/dispenser 2810.

The beverage preparation machine also includes a communication link 2811 for communicating with the weigh scale. The communication link may be implemented as a wired communication link, or a wireless communication link.

The beverage preparation machine also includes a display 2812, and may include a speaker 2813.

The weigh scale may include a memory or storage 2815, a controller 2816, a display 2817, and a speaker 2818. The weigh scale includes a communication link 2819, and a weight sensor 2820. The communication link may be implemented as a wired communication link, or a wireless communication link.

The arrangement of components illustrated in FIG. 28 is merely exemplary. The system may be implemented without some of the components shown in FIG. 28.

Figure 29:
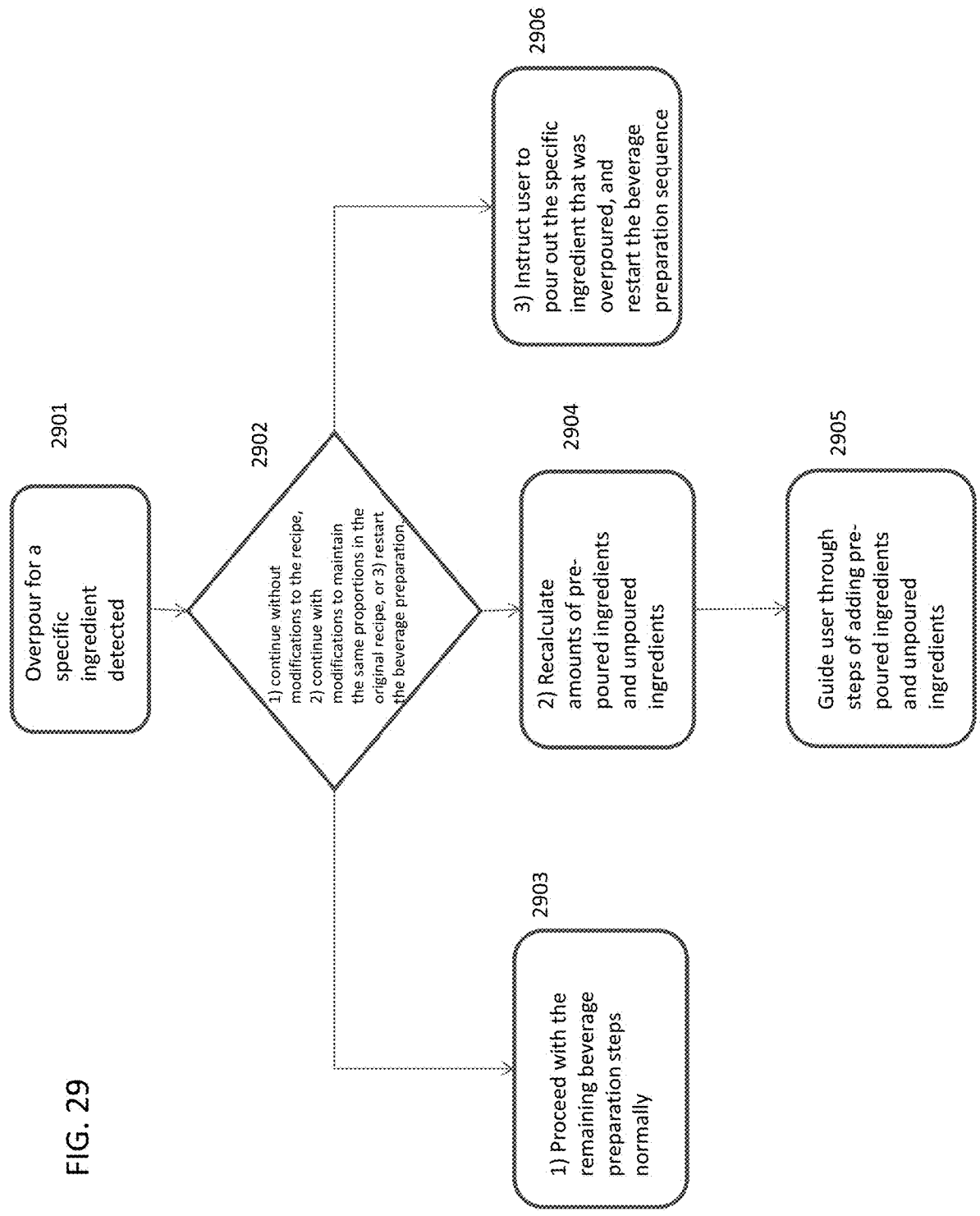
FIG. 29 shows a flowchart that illustrates how the system can manage an overpour condition according to user instructions.

According to yet another embodiment, as shown in FIG. 29, the beverage preparation system may assist a user if the weigh scale detects that the user has poured an excessive amount of ingredient into the receptacle (an "overpour"). The overpour may be accidental, or it may be intentional. For example, a user may accidentally pour too much of one ingredient into the beverage receptacle. Alternatively, the user may desire to may have a greater amount of one ingredient as compared to what a recipe calls for, in which case the overpour is intentional.

In the case of an overpour, the system can query whether the user wants to 1) continue without additional modifications to the recipe, 2) continue with modifications to the recipes so that the final ingredients are in the same proportions as the original recipe, or 3) restart the beverage preparation. In the case where the user chooses to continue with modifications to the recipe so that the final ingredients are in the same proportions as the original recipe, the system can calculate the amounts of pre-poured ingredients as well as the amounts of unpoured ingredients that need to be added and instruct the user accordingly. On the other hand, permitting the user to continue without modifications to the recipe allows the user to increase one or more ingredients, thereby customizing the beverage to the consumer's preference. The system can also permit the user to under-pour, by, for example, including an override command to continue notwithstanding that the weighed ingredient is less than what is called for by the recipe.

An algorithm may be used to assist the user, as follows and as shown in FIG. 29. If an overpour is detected (2901), a display on the beverage preparation system, located on either the weigh scale or on the beverage preparation machine, may display a message after an overpour for a specific ingredient is detected, advising the user of the overpour and querying whether the user would like to 1) continue without modification of other ingredients, 2) continue with modification to retain the same proportion of ingredients in accordance with the original recipe, or 3) restart the drink preparation, in which case the user would discard the contents of the container (2902).

If the user selects option 1), the beverage preparation system can proceed with the remaining beverage preparation steps normally. The user may select this option if he/she wishes to simply increase an amount of one ingredient as compared to the stored beverage recipe (2903).

If the user selects option 2), the beverage preparation system can recalculate the appropriate amounts of pre-poured ingredients and unpoured ingredients (2904). The system can also guide the user through the steps of adding pre-poured ingredients and unpoured ingredients (2905).

If the user selects option 3), the beverage preparation system can instruct the user to pour out the specific ingredient that was overpoured, and restart the beverage preparation sequence (2906).

The embodiments disclosed herein may also connect to an electronic device such as a smartphone, a tablet, a smart watch, a wearable electronic device, a laptop computer, a desktop computer, or the like, and allow customers to download preselected recipes or new custom recipes that can be used to prepare drinks from a predetermined set of available ingredients in the beverage preparation system. A user could browse recipes for beverages on the electronic device and then control the weigh scale unit or beverage preparation unit to download certain selected recipes in order to expand the range of beverages that the system can produce.

Figure 30B:
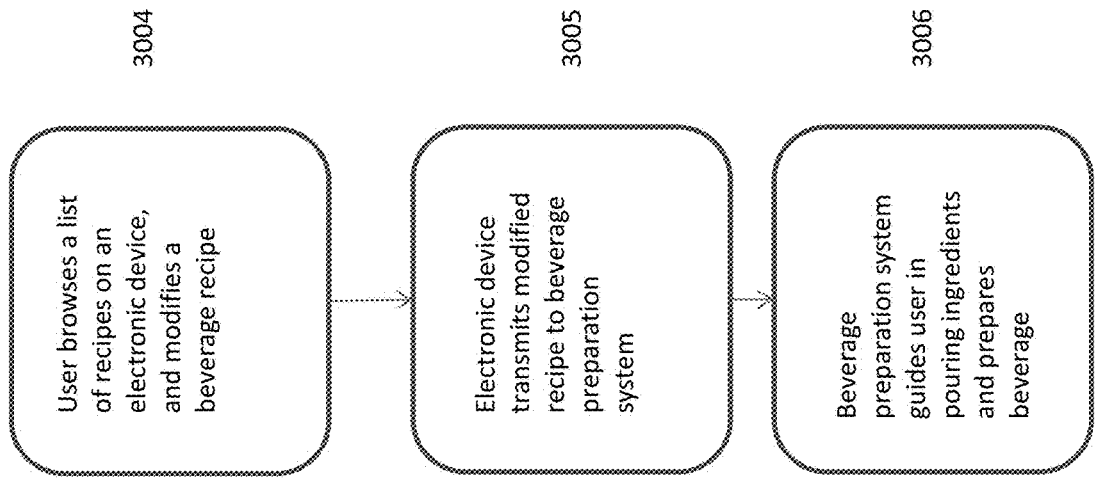
FIGS. 30A and 30B illustrate flowcharts for embodiments where a user can create or modify recipes on an electronic device and transmit the created/modified recipe to the beverage preparation system.
Figure 30A:
Figure 31A:
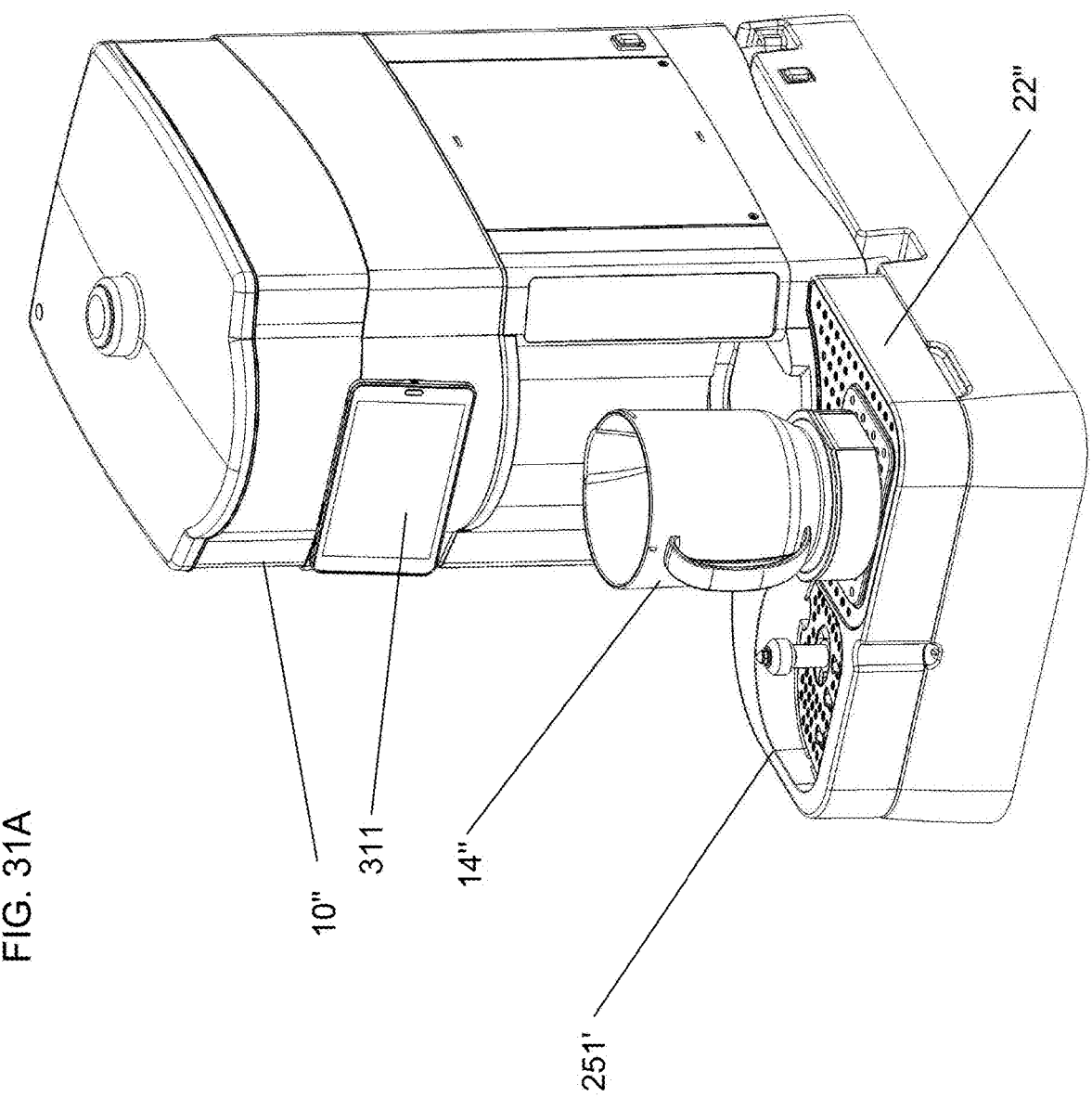
FIG. 31A shows an angled view of the beverage preparation machine according to one embodiment.
Figure 31B:
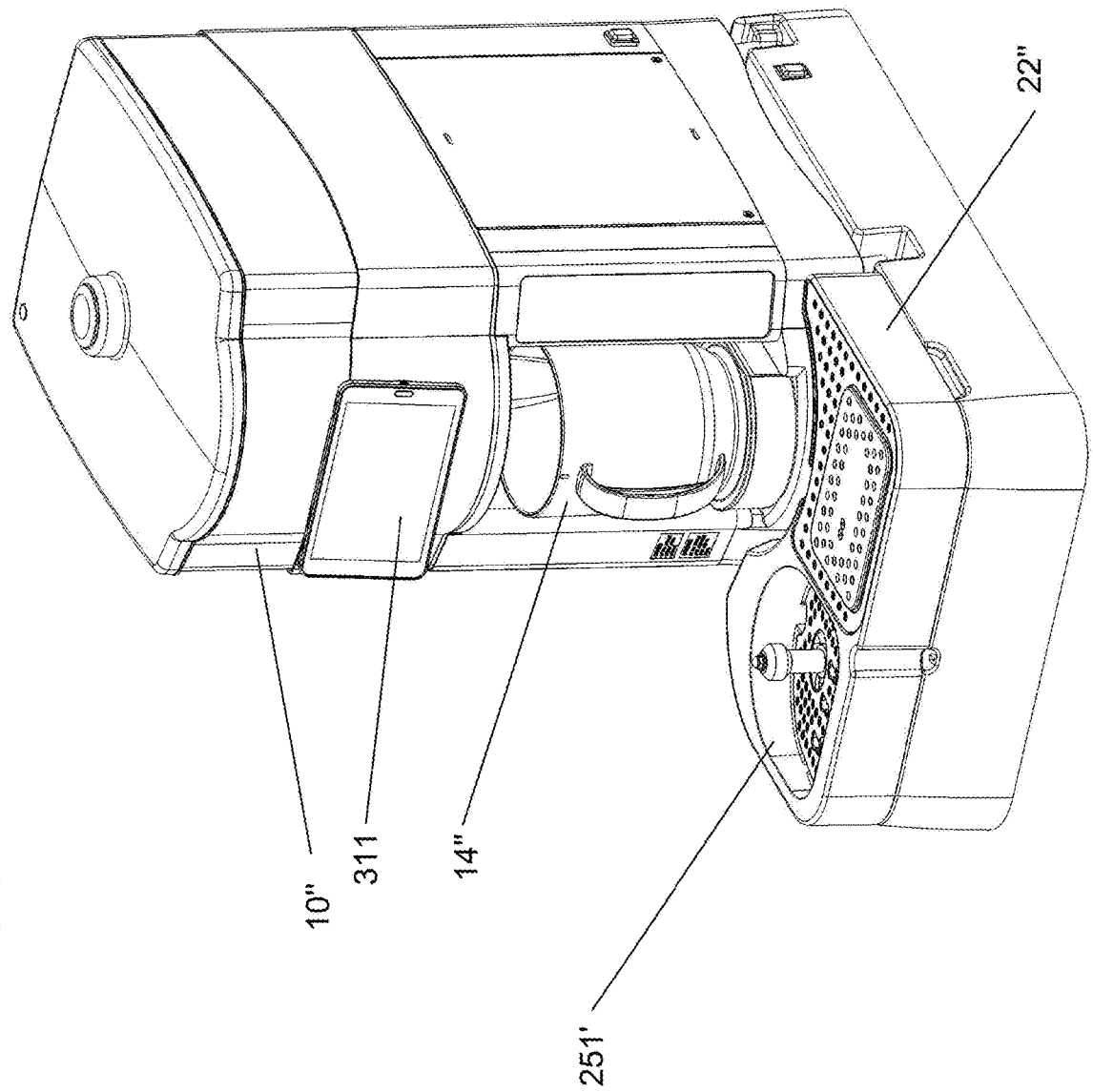
FIG. 31B shows another angled view of the beverage preparation machine according to one embodiment.
Figure 31D:
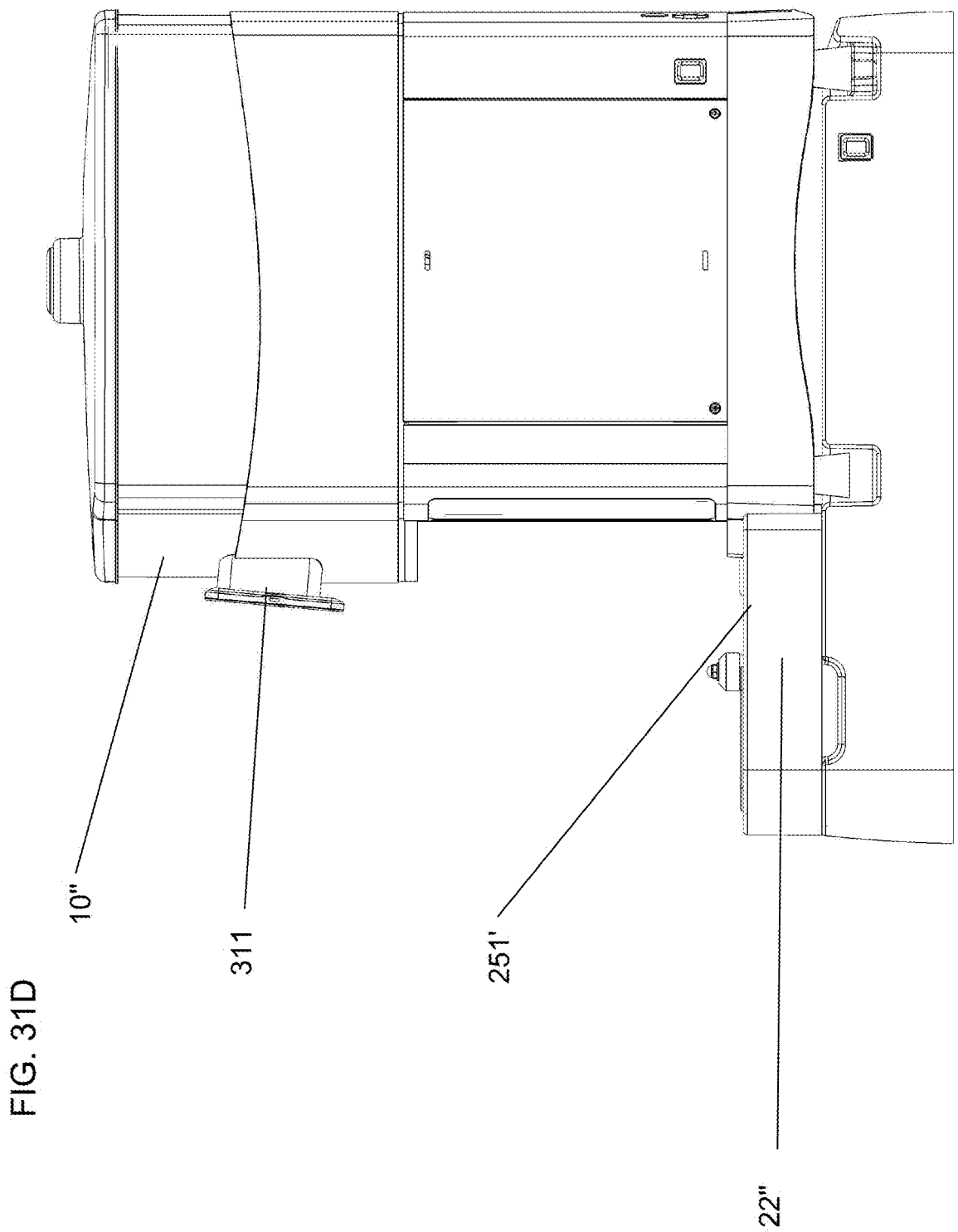
FIG. 31D shows a side view of the beverage preparation machine according to one embodiment.
Figure 31E:
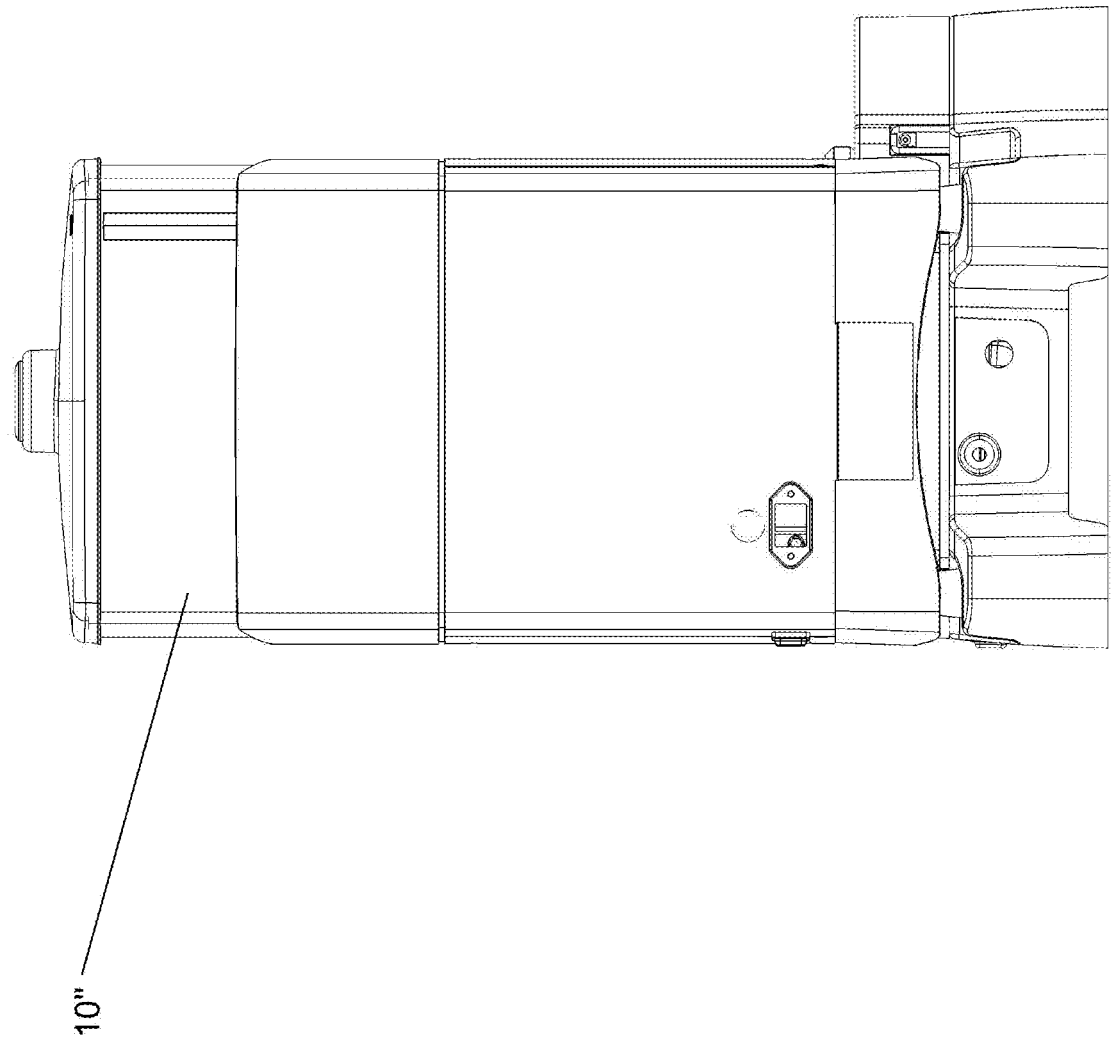
FIG. 31E shows a backside view of the beverage preparation machine according to one embodiment.
Figure 31F:
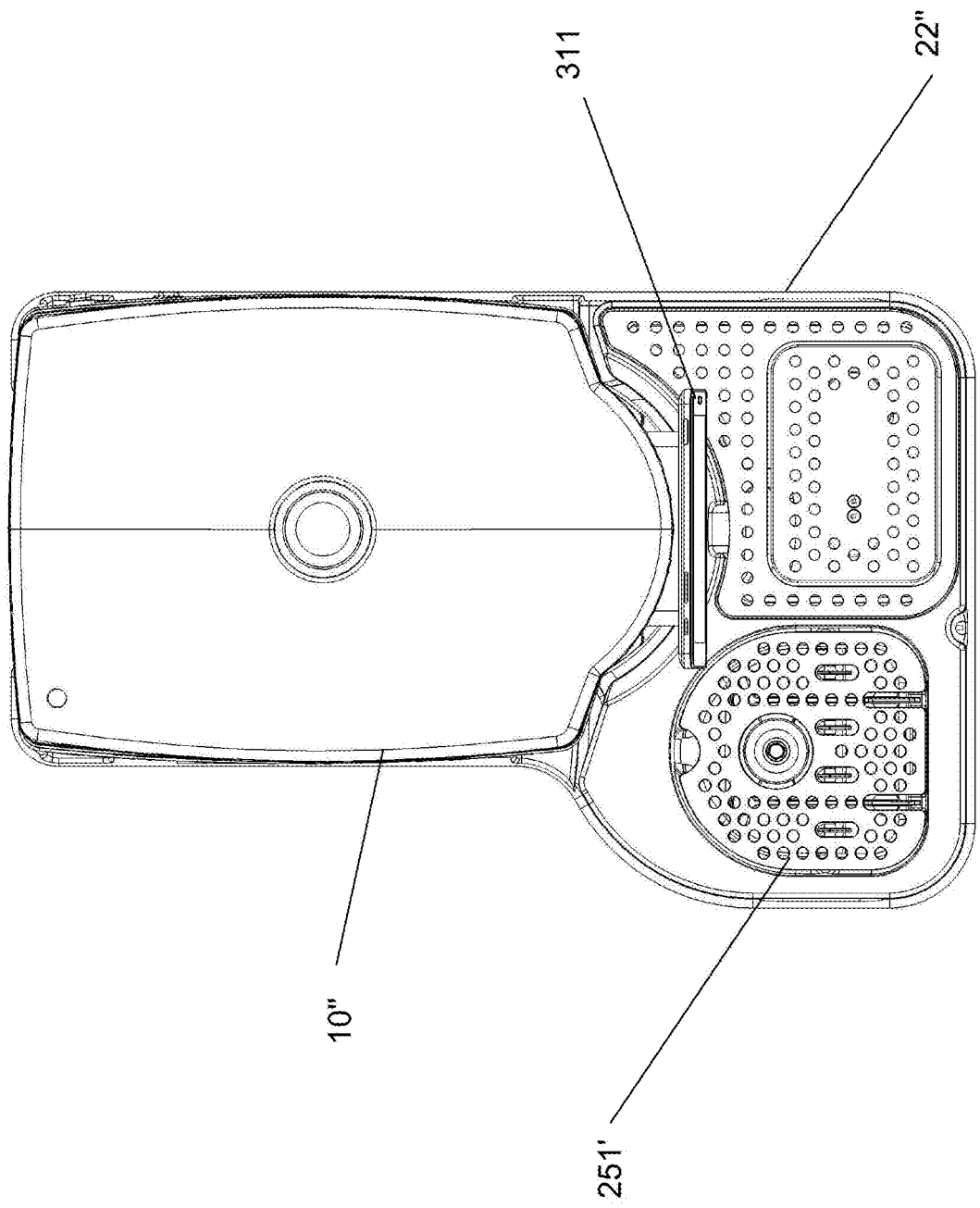
FIG. 31F shows a top-down view of the beverage preparation machine according to one embodiment.

As shown in FIG. 30A, a user could use the electronic device to create a new recipe by interacting with the electronic device to select one or more ingredients and specifying the quantities or ratios for each ingredient (3001). The ingredients could be selected from a predetermined database or manually entered by the user. For example, a user could create a recipe including protein powder, yogurt, and frozen strawberries. In this example, the user could then specify an amount of protein powder, such as 30 grams, an amount of yogurt, such as 10 ounces, and a quantity of strawberries, such as 10 strawberries. After the user creates the recipe on the electronic device, the user can enter a command on the electronic device that causes the user-created recipe to be sent to the beverage preparation system to be stored in a memory or storage, and/or that causes the beverage preparation system to display the user-created recipe (3002). The beverage preparation system can then guide the user in filling a receptacle placed on the weigh scale, and prepare the beverage with the beverage preparation machine (3003).

According to another embodiment shown in FIG. 30B, a user could use the electronic device to modify an existing recipe. For example, a user could browse existing recipes on the electronic device and change a quantity of at least one ingredient, or the ratios of the ingredients (3004). According to one example, a user could modify an amount of sugar in a beverage in order to produce a low-sugar beverage. Alternatively, for a beverage recipe composed of strawberry banana smoothie mix, yogurt, and individual frozen strawberries, a user could increase the amount of yogurt, or the number of strawberries to suit the user's preferences. For a beverage recipe composed of a 50-50 mixture of iced tea and lemonade, the user could modify the ratios to be 70% iced tea and 30% lemonade. After the user modifies the recipe on the electronic device, the user can enter a command on the electronic device that causes the user-modified recipe to be sent to the beverage preparation system to be stored in a memory or storage, and/or the cause the beverage preparation system to display the user-modified recipe (3005). The beverage preparation system could then guide the user in filling a receptacle placed on the weigh scale, and prepare the beverage with the beverage preparation machine (3006).

Alternatively, the user could create or modify beverages as described above by interacting with the beverage preparation system directly rather than through the electronic device. The user could interact with the beverage preparation system in this manner by selecting menu items displayed on a display located on either the weight scale or the beverage preparation machine.

According to another embodiment, the beverage preparation system, via a controller, can calculate pricing information based on information stored in a pricing database. The pricing database could be stored locally in the beverage preparation system. Alternatively, the pricing database could be stored in a remote location, such as on a remote server, and the beverage preparation system could access or download pricing information from the remote location/server. The pricing information could be associated with specific recipes, specific ingredients, or both.

For example, if the beverage preparation system is utilized in a retail environment, a user would first select a predetermined recipe and size of drink. Subsequently, the beverage preparation system could then access the pricing database, which would contain a price for the selected beverage. The beverage preparation system could then display the price for the selected recipe and request payment from the user.

The beverage preparation system could also recalculate pricing information that accounts for modifications to a recipe made by a user. For example, if a user selects a predetermined recipe that contains protein powder, the user may wish to add extra protein powder. The user could modify the recipe to include, for example, 20 additional grams of protein. The beverage preparation system would then determine the per-gram price of protein, by accessing the pricing database, and increase the price of the prepared beverage accordingly.

The beverage preparation system could also include hardware that facilitates commercial transactions, such as a credit card reader or a scanner that can scan a loyalty card with a barcode or other identifying information that indicates a specific person associated with the loyalty card. The pricing database may include an amount of money stored on the loyalty card.

FIGS. 31A-31F illustrate various views of a system that includes a beverage preparation machine 10″ and a weigh scale 22″ integrated with the beverage preparation machine 10″. Also shown in these figures is a receptacle/container 14″, a rinse station 251′ as described previously, and a display 311.

Features disclosed as being associated with certain embodiments could also be added to other embodiments disclosed herein. In other words, it is possible to combine different aspects of different beverage preparation embodiments.

The controllers of the above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with non-dedicated hardware (e.g., one or more processors) that is programmed using microcode or software to perform the functions recited above.

In this respect, it should be appreciated that one implementation comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer readable medium) encoded with a computer program (i.e., a plurality of instructions), which, when executed on one or more processors, performs above-discussed functions. The computer readable storage medium can be transportable such that the program stored thereon can be loaded onto any computer resource to implement functionality discussed herein. In addition, it should be appreciated that the reference to a computer program which, when executed, performs the above-discussed functions, is not limited to an application program running on a host computer. Rather, the term "computer program" is used herein in a generic sense to reference any type of computer code (e.g., software or microcode) that can be employed to program one or more processors to implement above-discussed techniques.

The phraseology and terminology used herein is for the purpose of description and should not be regarded as limiting. The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Several embodiments having been described in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A beverage preparation system comprising:
a weigh scale configured to weigh a beverage receptacle and ingredients within the beverage receptacle;
a user input interface;
a controller configured to receive weight data from the weigh scale;
a display; and
a beverage preparation machine;
wherein the display is configured to display a status of ingredient additions to the beverage receptacle based on the weight data;
the user input interface is configured to receive a selection of one or more beverage parameters from a user;
the controller is configured to execute a first recipe display sequence on the display from among a plurality of recipe display sequences based on the selected one or more beverage parameters; and
the controller is configured to communicate a first instruction for a first beverage preparation procedure to the beverage preparation machine from among a plurality of instructions for a plurality of possible beverage preparation procedures,
wherein the weigh scale is configured to detect that an amount of the ingredient that is added to the beverage receptacle exceeds an amount of the ingredient specified in a recipe, and
the display is configured to display, after the weigh scale detects the excessive amount of the ingredient:
a user prompt that, when selected, causes the beverage preparation system to continue without modifications to the recipe,
a user prompt that, when selected, causes the beverage preparation system to recalculate necessary amounts of other ingredients in order to maintain proportions of ingredients in accordance with the recipe, and
a user prompt that, when selected, causes the beverage preparation system to restart an ingredient addition step for each ingredient of the recip.

2. A beverage preparation system as in claim 1, wherein the beverage preparation machine includes a beverage receptacle sensor, and the beverage preparation machine is configured to automatically initiate the first beverage preparation procedure in response to the beverage receptacle sensor sensing a presence of the beverage receptacle.

3. A beverage preparation machine as in claim 1, wherein the beverage preparation machine is configured to initiate the first beverage preparation procedure after receiving the first instruction and prior to sensing the presence of the beverage receptacle.

4. A beverage preparation machine as in claim 1, wherein the beverage preparation machine is configured to send data to the controller.

5. A beverage preparation system as in claim 1, wherein the controller is configured to communicate the first instruction to the beverage preparation machine prior to the first recipe display sequence being completed.

6. A beverage preparation system as in claim 1, wherein the controller is configured to communicate the first instruction to the beverage preparation machine after the first recipe display sequence has been completed.

7. An apparatus for facilitating preparation of a beverage, the apparatus comprising:
a weigh scale configured to weigh a beverage receptacle and ingredients within the beverage receptacle;
a user input interface configured to receive a beverage parameter from a user;
a controller configured to receive weight data from the weigh scale; and
a display configured to display a status of ingredient additions to the beverage receptacle based on the weight data;
the controller is configured to execute a first recipe display sequence on the display from among a plurality of recipe display sequences based on the received beverage parameter; and
the controller is configured to send a first instruction for a first beverage preparation procedure to a beverage preparation machine from among a plurality of instructions for a plurality of possible beverage preparation procedures, the first instruction being based on the received beverage parameter,
wherein the weigh scale is configured to detect that an amount of the ingredient that is added to the beverage receptacle exceeds an amount of the ingredient specified in a recipe, and
the display is configured to display, after the weigh scale detects the excessive amount of the ingredient:
a user prompt that, when selected, causes the apparatus to continue without modifications to the recipe,
a user prompt that, when selected, causes the apparatus to recalculate necessary amounts of other ingredients in order to maintain proportions of ingredients in accordance with the recipe, and
a user prompt that, when selected, causes the apparatus to restart an ingredient addition step for each ingredient of the recipe.

8. An apparatus for facilitating preparation of a beverage as in claim 7, wherein the user input interface is configured to receive a plurality of beverage parameters from a user, and the first instruction is based on the received beverage parameters.

9. A beverage preparation system comprising:
a memory configured to store a recipe, wherein the recipe comprises an ingredient addition step and a beverage preparation step;
a weigh scale configured to weigh a beverage receptacle and generate weight data;
a display configured to display the ingredient addition step and a real-time visual representation of an amount of an ingredient that is added to the beverage receptacle;
a controller configured to receive the weight data; and
a beverage preparation machine configured to perform the beverage preparation step,
wherein the weigh scale and the beverage preparation machine are in communication such that the weigh scale is able to send signals to the beverage preparation machine and/or the beverage preparation machine is able to send signals to the weigh scale,
wherein the weigh scale is configured to detect that the amount of the ingredient that is added to the beverage receptacle exceeds an amount of the ingredient specified in the recipe, and the display is configured to display, after the weigh scale detects the excessive amount of the ingredient:
a user prompt that, when selected, causes the beverage preparation system to continue without modifications to the recipe,
a user prompt that, when selected, causes the beverage preparation system to recalculate necessary amounts of other ingredients in order to maintain proportions of ingredients in accordance with the recipe, and
a user prompt that, when selected, causes the beverage preparation system to restart the ingredient addition step for each ingredient of the recipe.

10. The beverage preparation system according to claim 9, wherein the beverage preparation machine is configured to perform pre-processing steps or begin the beverage preparation step when a threshold amount of ingredient is added to the beverage receptacle and weighed by the weigh scale.

11. The beverage preparation system according to claim 9, wherein the display is configured to display the recipe, and
wherein the beverage preparation machine is configured to perform pre-processing steps or begin the beverage preparation step when a user selects the recipe.

12. The beverage preparation system according to claim 9, further comprising a storage for beverage preparation ingredients and one or more sensors that measure an amount of each ingredient stored in the storage;
wherein the one or more sensors are in communication with the controller.

13. The beverage preparation system according to claim 9, wherein the weigh scale and the beverage preparation machine are in wireless communication with each other.

14. The beverage preparation system according to claim 9, wherein the weigh scale and the beverage preparation machine are physically integrated to form a single structure.

15. The beverage preparation system according to claim 9, wherein the beverage preparation machine comprises at least one of: an ice shaver or a rinse station with a sprinkler that is configured to disperse fluid for cleaning the beverage receptacle.

16. The beverage preparation system according to claim 15, wherein the beverage preparation machine comprises both the ice shaver and the rinse station, and
the beverage preparation machine is configured to simultaneously perform at least two of: operation of the ice shaver, operation of the beverage preparation step, and operation of the sprinkler.

17. The beverage preparation system according to claim 9, wherein the beverage preparation machine comprises a beverage receptacle receiving area, and a sensor configured to detect a presence of the beverage receptacle in the beverage receptacle receiving area, and the beverage preparation machine is configured to perform the beverage preparation step automatically after the presence of the beverage receptacle in the beverage receptacle receiving area is detected.

18. The beverage preparation system according to claim 9, further comprising:
a pricing database that stores pricing information for ingredients and recipes,
wherein the controller is configured to receive the pricing information and cause the display to display the pricing information for at least one recipe or at least one ingredient.

19. The beverage preparation system according to claim 9, wherein the display is configured to display an override command that causes the beverage preparation system to continue with a next ingredient addition step of the recipe or beverage preparation when a detected amount of the ingredient is less than an amount specified in the recipe.

20. The beverage preparation system according to claim 9, wherein the recipe comprises an additional ingredient step comprising adding an amount of a solid ingredient, wherein the amount is an integer, and wherein the display is configured to display the additional ingredient step and the integer.

* * * * *